United States Patent
Jagalpure et al.

(10) Patent No.: US 11,328,273 B2
(45) Date of Patent: May 10, 2022

(54) METHODS AND SYSTEMS FOR A RELIABLE PAYMENT TRANSACTION

(71) Applicant: MASTERCARD INTERNATIONAL INCORPORATED, Purchase, NY (US)

(72) Inventors: Venkatesh Jagalpure, Maharashtra (IN); Ketan Shrikant Joshi, Maharashtra (IN); Gaurav K Patni, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/685,223

(22) Filed: Nov. 15, 2019

(65) Prior Publication Data
US 2020/0210977 A1 Jul. 2, 2020

(30) Foreign Application Priority Data

Dec. 27, 2018 (SG) .......................... 10201811695W

(51) Int. Cl.
*G06Q 20/10* (2012.01)
*G06Q 20/40* (2012.01)

(52) U.S. Cl.
CPC ....... *G06Q 20/108* (2013.01); *G06Q 20/4097* (2013.01)

(58) Field of Classification Search
CPC .......................... G06Q 20/108; G06Q 20/4097
See application file for complete search history.

(56) References Cited

U.S. PATENT DOCUMENTS

| 6,119,105 A | * | 9/2000 | Williams | G06Q 20/00 705/26.35 |
| 8,848,608 B1 | * | 9/2014 | Addepalli | H04W 8/06 370/328 |

(Continued)

OTHER PUBLICATIONS

T. N. T. Nguyen, P. Shum and E. H. Chua, "Secure end-to-end mobile payment system," 2005 2nd Asia Pacific Conference on Mobile Technology, Applications and Systems, 2005, pp. 4 pp. -4 doi: 10.1109/MTAS.2005.207231. (Year: 2005).*

*Primary Examiner* — Bruce I Ebersman
*Assistant Examiner* — Steven R Chism
(74) *Attorney, Agent, or Firm* — Budzyn IP Law, LLC

(57) ABSTRACT

Embodiments provide method and systems for determining connectivity information of payment network for a reliable payment transaction. The method includes receiving a connectivity information request before performing a payment transaction via payment network. The method includes generating a connectivity check message including a plurality of connectivity status flags associated with payment entities in payment network. The method includes sending the connectivity check message to the payment entities in a predefined sequence of a payment transaction flow in the payment network. The method further includes facilitating setting up the plurality of connectivity status flags based on a successful communication of the connectivity check message between the payment entities in the predefined sequence. The method includes determining if each of the plurality of connectivity status flags is set with the success state. Upon determining the success state, the method further includes generating a successful connectivity information for performing the payment transaction.

3 Claims, 12 Drawing Sheets

(56) References Cited

U.S. PATENT DOCUMENTS

| | | | |
|---|---|---|---|
| 2003/0140007 A1* | 7/2003 | Kramer | G06Q 20/04 |
| | | | 705/40 |
| 2013/0204785 A1* | 8/2013 | Monk | G06Q 20/322 |
| | | | 705/44 |
| 2015/0095225 A1* | 4/2015 | Appana | G06Q 20/3674 |
| | | | 705/41 |
| 2017/0180191 A1* | 6/2017 | Coburn | H04L 29/06 |
| 2017/0236106 A1* | 8/2017 | Lorberg | G06Q 20/108 |
| | | | 705/42 |

* cited by examiner

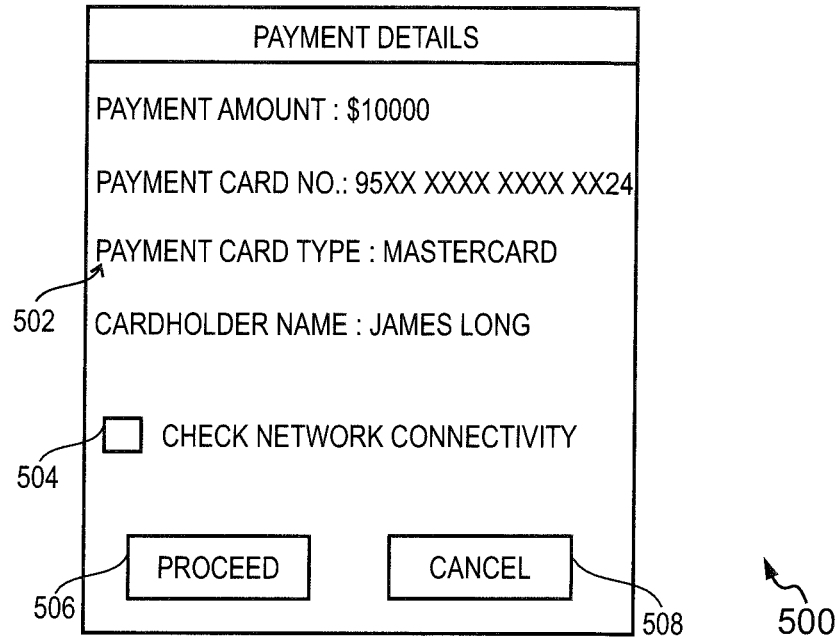
FIG. 5A
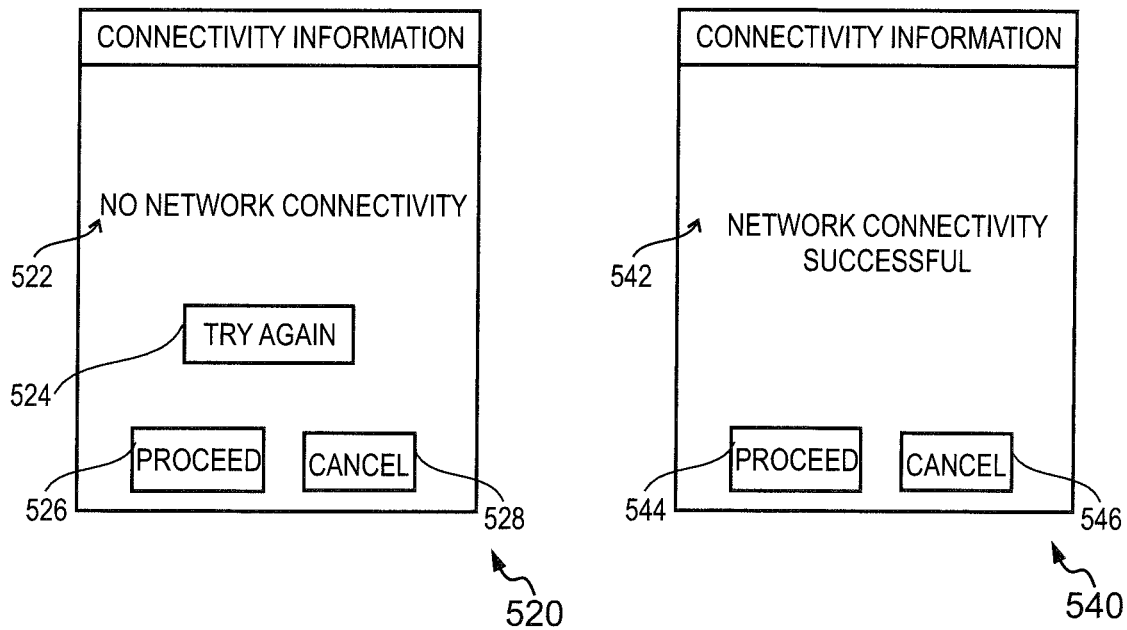
FIG. 5B
FIG. 5C

METHODS AND SYSTEMS FOR A RELIABLE PAYMENT TRANSACTION

TECHNICAL FIELD

The present disclosure relates to payment transactions and, more particularly to, methods and systems for checking end to end connectivity of payment network prior to performing a reliable payment transaction.

BACKGROUND

The adoption of digital payment infrastructures by merchant outlets offers a simple and convenient way for customers to perform transactions at the merchant outlets. With advanced technologies employed by the digital payment infrastructures, financial transactions using payment cards (e.g., credit card, debit card) at point-of-sale terminals of merchant facilities such as, retail establishments, online stores or business establishments that handle cash or credit transactions has been gaining momentum.

In a typical POS transaction involving payment cards, a cardholder reaches a POS terminal and presents his payment card to an agent at the merchant facility who swipes the payment card to read payment card information. The agent may provide the transaction amount and process the payment transaction. Alternatively, if the customer has purchased goods/services online, during check out, the customer provides the payment card information in a payment page. The processing of such payment transaction is performed by different entities (e.g., issuer, acquirer, payment gateway, etc.) for approving the payment transaction. In such cases, each entity involved in the payment transaction must be able to connect and share data with others in an encrypted manner. However, there are scenarios wherein the payment transaction shows up as failed at the POS terminal/payment page but the customer is notified by his/her issuer bank that money has been deducted from customer account already.

When a payment transaction involving a huge amount fails, the money gets deducted and credits are locked. In such cases, scrutinizing and establishing the entity responsible for the failure and processing a refund may consume a significant amount of time which may limit the spending limit of the customer. Moreover, there may be situations wherein the customer may get into a situation of shortage of funds to make another transaction of high amount before the refund happens.

The payment transaction may fail due to a number of reasons such as, network connectivity issues, technology failures, security failures, invalid data entry by the customer, failure to update payment status, down time of one or more of the entities, and or similar reasons. However, the payment transactions mostly fail due to network connectivity issues. Network connectivity issues may arise when data sent by an entity does not adhere to a standard security requirement of a receiving entity and thereby the receiving entity may not be capable of processing the data and responding within a scheduled time that may lead to failure in payment transactions.

In view of the above discussion, there exists a need for a technique to determine network connectivity prior to performing payment transactions at POS terminals so as to preclude failure of payment transactions and credits being locked.

SUMMARY

Various embodiments of the present disclosure provide methods and systems for checking network connectivity before performing a payment transaction.

In an embodiment, a method is disclosed. The method includes receiving, by a server system, a connectivity information request before performing a payment transaction via a payment network. The method includes generating, by the server system, a connectivity check message including a plurality of connectivity status flags associated with one or more payment entities in the payment network. The method also includes sending, by the server system, the connectivity check message to the one or more payment entities in a predefined sequence of a payment transaction flow in the payment network. The method further includes facilitating, by the server system, setting up the plurality of connectivity status flags based on a successful communication of the connectivity check message between the one or more payment entities in the predefined sequence. A payment entity of the one or more payment entities sets at least one connectivity status flag associated with the payment entity to a success state based on the successful communication handled by the payment entity. The method includes determining, by the server system, if each of the plurality of connectivity status flags is set with the success state. The method further includes upon determining the success state of each of the plurality of connectivity status flags, generating, by the server system, successful connectivity information for performing the payment transaction.

In another embodiment, a server system is disclosed. The server system includes a memory configured to store instructions and at least one processor configured to execute the stored instructions to cause the server system to perform the method. The method includes receiving, by a server system, a connectivity information request before performing a payment transaction via a payment network. The method includes generating, by the server system, a connectivity check message including a plurality of connectivity status flags associated with one or more payment entities in the payment network. The method also includes sending, by the server system, the connectivity check message to the one or more payment entities in a predefined sequence of a payment transaction flow in the payment network. The method further includes facilitating, by the server system, setting up the plurality of connectivity status flags based on a successful communication of the connectivity check message between the one or more payment entities in the predefined sequence. A payment entity of the one or more payment entities sets at least one connectivity status flag associated with the payment entity to a success state based on the successful communication handled by the payment entity. The method includes determining, by the server system, if each of the plurality of connectivity status flags is set with the success state. The method further includes upon determining the success state of each of the plurality of connectivity status flags, generating, by the server system, successful connectivity information for performing the payment transaction.

In yet another embodiment, a method is disclosed. The method includes receiving, by a server system, a connectivity information request before performing a payment transaction via a payment network. The method also includes generating, by the server system, a connectivity check message comprising a plurality of connectivity status flags associated with one or more payment entities in the payment network, wherein (1) at least one connectivity status flag is associated with a receiving terminal of each payment entity of the one or more payment entities; and (2) at least one connectivity status flag is associated with a sending terminal of each payment entity of the one or more payment entities. The method includes sending, by the server system, the connectivity check message to the one or more payment entities in a predefined sequence of a payment transaction flow in the payment network. The method further includes facilitating, by the server system, setting up the plurality of connectivity status flags based on a successful communication of the connectivity check message between the one or more payment entities in the predefined sequence. A payment entity of the one or more payment entities is configured to (1) set the at least one connectivity status flag associated with the receiving terminal to a success state upon successful receipt of the connectivity check message; and (2) set the at least one connectivity status flag associated with the sending terminal to the success state upon successful sending of the connectivity check message. The method includes determining, by the server system, if each of the plurality of connectivity status flags is set with the success state. The method furthermore includes upon determining the success state of each of the plurality of connectivity status flags, generating, by the server system, successful connectivity information for performing the payment transaction.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 5A illustrates an example representation of a UI displayed to a cardholder on a merchant terminal providing an option for determining connectivity information of one or more entities in a payment network prior to performing a payment transaction, in accordance with an example embodiment;

FIG. 5B illustrates an example representation of a UI displayed to a cardholder on a merchant terminal depicting connectivity information of the one or more entities in the payment network prior to performing a payment transaction, in accordance with an example embodiment;

FIG. 5C illustrates an example representation of a UI displayed to a cardholder on a merchant terminal depicting connectivity information of the one or more entities in the payment network prior to performing a payment transaction, in accordance with an example embodiment;

Figure 1:
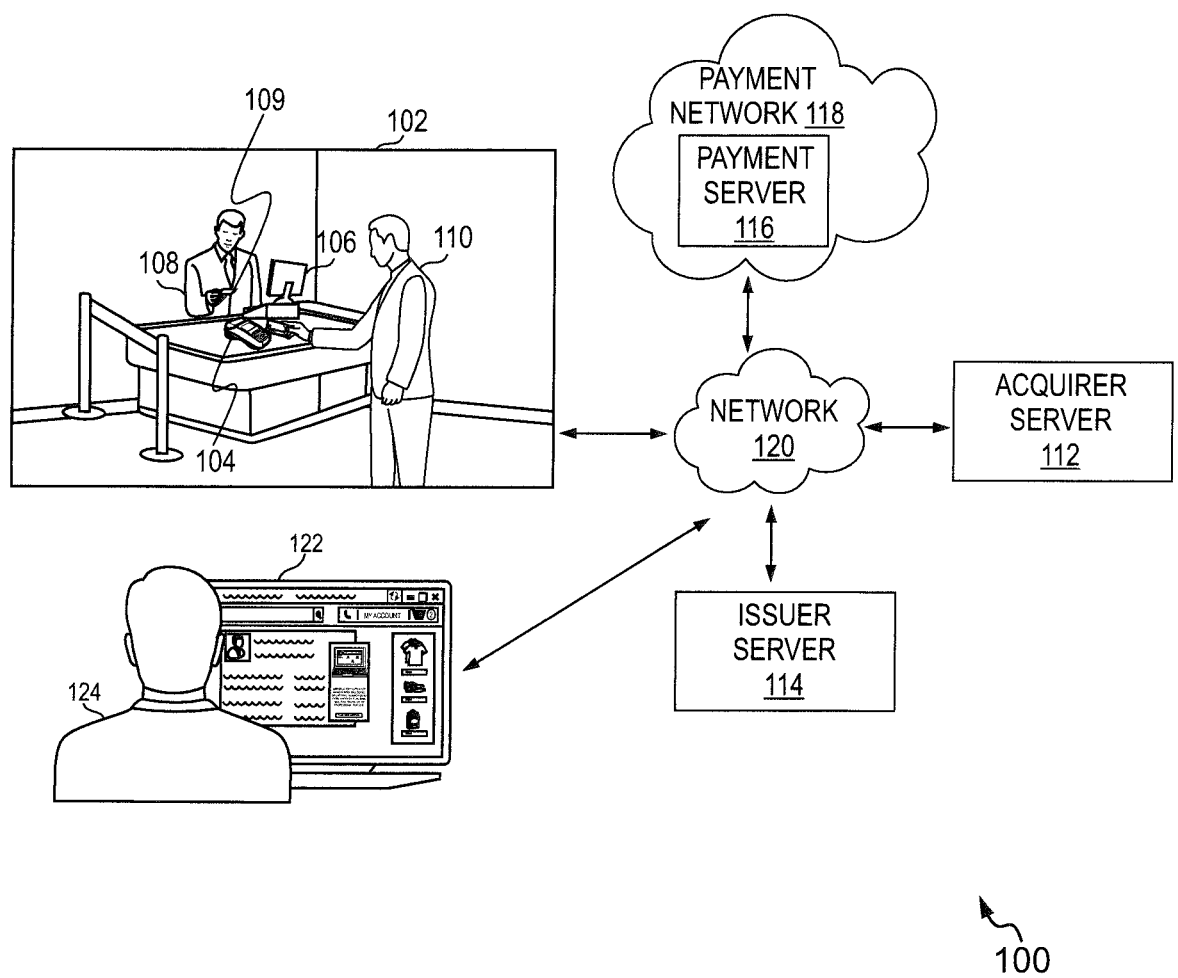
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer account" used throughout the description refers to a financial account that is used to fund the financial transaction (interchangeably referred to as "payment transaction"). Further, the term "acquirer account" used throughout the description refers to a financial account of a merchant or any entity which receives the fund from the issuer account. Examples of the issuer account and the acquirer account include, but are not limited to a savings account, a credit account, a checking account, digital wallet, and a virtual payment account. Each of the issuer account and the acquirer account may be associated with an entity such as an individual person, a family, a commercial entity, a company, a corporation, a governmental entity, a non-profit organization and the like. In some scenarios, an issuer or acquirer account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card include, but are not limited to, debit cards, credit cards, prepaid cards, digital wallet, virtual payment numbers, virtual card numbers, forex card, charge cards and stored-value cards. A payment card may be a physical card that may be presented to the merchant for funding the payment. Alternatively or additionally, the payment card may be embodied in the form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

Overview

In an example scenario, a cardholder may offer to pay for goods purchased at a merchant facility using a payment card. The merchant facility may be a physical store such as, a retail establishment or an online store. The cardholder presents his payment card to an agent at a merchant terminal for initiating a payment transaction. If the payment transaction is initiated for the online store, the cardholder provides payment card information during check out from the online store on a payment page (hosted by the online store). Various embodiments of the present disclosure provide methods and systems to check network connectivity of one or more entities in a payment network before performing a payment transaction. More specifically, embodiments provide techniques to determine if the one or more entities involved in the payment transaction are available to handle the payment transaction.

Various example embodiments provide methods, systems, user devices and computer program products for generating a connectivity message that may be processed by the one or more entities in the payment network for determining connectivity information of the one or more entities before performing the actual payment transaction. In at least one example embodiment, when the payment card is swiped at a merchant terminal or the payment card information is provided for performing online payments for online stores, a prompt is displayed to the cardholder. The prompt includes an option for the cardholder to check network connectivity by determining the connectivity information of the one or more entities in the payment network. This ensures additional security for payment transactions that involve high transaction amounts that may fail due to issues in the network connectivity of the one or more entities.

In at least one example embodiment, when the cardholder provides a selection input on the option for determining the connectivity information of the one or more entities in the payment network, a connectivity information request is sent to a server system associated with the merchant facility. The connectivity information request includes at least the payment card information and the option. In an embodiment, the server system generates a connectivity check message for determining the connectivity information of the one or more entities in the payment network. The connectivity check message includes a plurality of connectivity status flags. Each connectivity status flag is associated with a payment entity of the one or more payment entities in the payment network. The server system generates a payment transaction request comprising the payment card information for the payment transaction based on the connectivity information request and stores it in the server system. Some examples of the server system may include but not limited to acquirer server, payment server and the issuer server. It shall be noted that the server system may also be a payment entity and the connectivity check message may be sent to the one or more payment entities including the server system.

In an embodiment, the connectivity check message is sent to the one or more payment entities in a predefined sequence of a payment transaction flow in the payment network. An example of the predefined sequence of the payment transaction flow may be as follows, the connectivity check message may be sent from an acquirer server to a payment server and the payment server may send the connectivity check message to the issuer server. Further, the issuer server may send the connectivity check message to the payment server and the payment server may send the connectivity check message to the acquirer server. In an embodiment, the server system facilitates each payment entity to set at least one payment status flag of the plurality of payment status flags in the connectivity check message. The payment entity may set a payment status flag associated with the payment entity upon successfully communicating the connectivity check message to another payment entity based on the predefined sequence of the payment transaction flow. The term 'successfully communicating' refers to both sending and/or receiving the connectivity check message. For example, the plurality of payment status flags may be preset to a failure state, say 'Y' and the payment entity (acquirer server) associated with a payment status flag F1 on successfully communicating the connectivity check message to another payment entity (payment server) may set the flag F1 to a success state, say 'X'. Alternatively, if the payment entity (acquirer server) is unable to successfully communicate the connectivity check message with another payment entity (payment server) the flag F1 remains at the failure state (Y). The connectivity check message is communicated between the one or more payment entities in the predefined sequence and each time the connectivity check message is sent to a payment entity, the payment entity sets a corresponding status flag on successful communication or retains the failure state on a failure communication.

In at least one example embodiment, the server system receives the connectivity check message at an end of payment transaction flow and checks the connectivity check message. If the plurality of payment status flags in the connectivity check message is set to a success state, a successful connectivity information is displayed to the cardholder at the merchant terminal. Alternatively, even if one of the payment status flags is detected at a failure state, then a failure connectivity information is displayed to the cardholder at the merchant terminal/payment page. The cardholder may decide to proceed with the payment transaction upon receiving the successful connectivity information. When the cardholder provides his/her consent/approval for the payment transaction, the payment transaction request stored in the server system is further processed by the one or more payment entities in the payment network for facilitating the payment transaction between an issuer account of the cardholder and an acquirer account of the merchant.

Various example embodiments of present invention are described hereinafter with reference to FIGS. 1 to 13. An environment for determining connectivity information of the one or more payment entities in the payment network before performing a payment transaction at a merchant facility is explained in detail with reference to FIG. 1.

FIG. 1 illustrates an exemplary representation of an environment 100, in which at least some example embodiments of the present disclosure can be implemented. The environment 100 is exemplarily shown as a merchant facility 102 (also referred to herein as 'a merchant 102') equipped with a merchant terminal 104 (also referred to as 'a POS terminal 104') and a merchant interface device 106. Examples of the merchant facility 102 may include any retail establishments such as, restaurant, supermarket or business establishments such as, government and/or private agencies, toll gates, parking lot or any such place equipped with POS terminals, such as the merchant terminal 104 where customers visit for performing financial transaction in exchange for any goods and/or services or any transaction that requires financial transaction between customers and a merchant. In various embodiments, the merchant interface device 106 can be a telephone or a computer system operated by an agent 108 for performing payment transactions on behalf of a customer, for example, a cardholder 110. As seen in FIG. 1, the merchant interface device 106 is a computer system operated by the agent 108. It shall be noted that herein the merchant terminal 104 refers to a POS machine which is used to swipe payment cards and not the entire setup including, cash drawers, printers and barcode scanners.

The environment 100 also exemplarily depicts a cardholder 124 associated with a cardholder device 122. Examples of the cardholder device 122 include, but are not limited to, a personal computer (PC), a tablet device, a personal digital assistant (PDA), a smartphone and a laptop. The cardholder 124 may access an e-commerce website interface (online store) facilitated by the merchant 102 on the device 122. It shall be noted that the term 'merchant terminal' may also refer to the online store of the merchant 102.

In an example scenario, the cardholder 110 may purchase goods from the merchant 102 and offer to pay for the goods using a payment card 109. In conventional scenarios, the cardholder 110 would reach the merchant terminal 104 upon his turn and hand over the payment card 109 to the agent 108. The agent 108 may swipe the payment card 109 at the merchant terminal 104 that may display a prompt including an option for the cardholder 110 to check for network connectivity of the payment network 118 before performing the payment transaction. More specifically, the option provides the cardholder 110 a benefit of determining if one or more payment entities in a payment network 118 can effectively complete the payment transaction. The term 'payment entities' refer to a collection of servers and/or payment gateways that process the payment transactions. Examples of the one or more payment entities include but are not limited to acquirer, issuer, payment gateway among others.

In another example scenario, the cardholder 124 may purchase goods at the online store and checkout via the cardholder device 122. When the cardholder 124 checks out of the online store, payment page is displayed on the cardholder device 122. The cardholder 124 provides payment card information in the payment page. Additionally, the payment page may include the prompt providing an option for determining the connectivity information of the one or more payment entities prior to performing the payment transaction. For example, if the payment transaction involves a huge amount, the cardholder 124 may choose to determine the connectivity information so as to mitigate payment transaction failures due to connectivity issues between the one or more payment entities. It shall be noted that hereinafter the invention is described with reference to the payment transaction performed at the merchant terminal 104 of the merchant facility 102 for the sake of brevity. However, it should be apparent to a person skilled in the art that various embodiments of the disclosure may be practiced with/without slight modifications for the payment transactions performed at online stores hosted by the merchant 102.

When the cardholder 110 provides a consent to determine the connectivity information of the one or more payment entities in the payment network 118, the merchant terminal 104 generates a connectivity information request. The connectivity information request includes the payment card information of the cardholder 110 and the option to determine the connectivity information. The merchant terminal 104 sends the connectivity information request to the acquirer server 112. The acquirer server 112 reads the connectivity information request and generates (1) a connectivity check message and (2) a payment transaction request. The payment transaction request includes the payment card information of the cardholder 110 and optionally a transaction amount for the goods/services purchased at the merchant 102. The acquirer server 112 saves the payment transaction request in a database (not shown) associated with the acquirer server 112.

In an example embodiment, the connectivity check message includes an identifier for the one or more payment entities depicting the connectivity check message and a plurality of payment status flags. For example, the connectivity check message may include an identifier 'D' denoting that the connectivity check message followed by the plurality of connectivity status flags. In some example embodiments, each payment entity of the one or more payment entities is associated with at least one payment status flag. For example, the connectivity check message may include the connectivity status flags F1, F2, F3. The flag F1 is for the acquirer server 112, the flag F2 is for the payment server 116 and the flag F3 is for the issuer server 114. The plurality of connectivity status flags F1, F2, F3 is initially preset to a failure state 'Y' or '0'. As an example, the plurality of connectivity status flags F1, F2, F3 read "YYY" or "000". In an embodiment, each payment entity is configured to set a corresponding connectivity status flag when the payment entity is able to successfully communicate the connectivity check message. For example, the payment server 116 determines if the payment server 116 can receive and send the connectivity check message. When the payment server 116 is able to communicate with the other payment entities, for example, receive the connectivity check message from the acquirer server 112 and send the connectivity check message to the issuer server 114, the payment server 116 sets the corresponding flag F2 to a success state 'X' or '1'.

In another example embodiment, the connectivity check message may include one flag for a sending terminal of a payment entity and one flag for a receiving terminal of the payment entity. For example, a sending terminal (S1) of the acquirer server 112 may be associated with a connectivity status flag F1 and a receiving terminal (R1) of the acquirer server 112 may be associated with a connectivity status flag F2. Accordingly, if the one or more payment entities in the payment network 118 are the acquirer server 112, payment server 116 and the issuer server 114, the connectivity check message includes connectivity status flags F1, F2, F3, F4, F5, F6, wherein flags F3, F4 are associated with a sending terminal (S2) and a receiving terminal (R2) of the payment server 116, respectively and flags F5, F6 are associated with a sending terminal (S3) and a receiving terminal (R3) of the issuer server 114, respectively. In such cases, whenever, the payment entity receives the connectivity check message successfully, the payment entity sets a corresponding connectivity status flag to a success state. For example, when the issuer server 114 receives the connectivity check message successfully at the receiving terminal (R3), the issuer server 114 sets a corresponding connectivity status flag F6 to a success state.

In an embodiment, the connectivity check message is communicated between the one or more payment entities in a predefined sequence of a payment transaction flow in the payment network 118. The term 'payment transaction flow' refers to a sequence flow of the payment transaction via the one or more payment entities in the payment network 118. An example of the predefined sequence of the payment transaction flow in the payment network 118 is such that the connectivity check message may be received by the acquirer server 112 as a part of the connectivity check request from the merchant terminal 104, the acquirer server 112 sends the connectivity check message to the issuer server 114, the issuer server 114 may read and/or process the connectivity check message and send it to the payment server 116 which sends it back to the acquirer server 112. It shall be noted that the above predefined sequence is for exemplary purpose only and a payment transaction/transaction may follow a different predefined sequence than the sequence mentioned above.

As explained above, the connectivity check message is communicated between the one or more payment entities in the predefined sequence. A payment entity, for example, the acquirer server 112 that initiated/started sending the connectivity check message based on the payment transaction flow in the predefined sequence, upon receiving the connectivity check message, checks each connectivity status flag of the plurality of connectivity status flags in the connectivity check message. If the plurality of connectivity status flags are set to a success state, successful connectivity information is sent by the payment entity (acquirer server 112) processing the connectivity check message to the merchant terminal 104. For example, if the flags F1, F2, F3 of the payment entities (acquirer server 112, payment server 116 and the issuer server 114) are set to the success state, for example, flags "F1F2F3" set to "XXX" implying success state, it indicates that the payment entities are prepared to handle the payment transaction. Alternatively, if at least one of the connectivity status flag remains in a failure state, then a failure connectivity information is displayed at the merchant terminal 104. Assuming, the sending terminal (S2) of the payment server 116 was unavailable for communication, the flag F2 corresponding to the payment server 116 retains the initially preset failure state. The connectivity message including flags "F1F2F3" would appear as "XYX" indicating the payment entity (the payment server 116) is not prepared to handle the payment transaction. It shall be noted that although a sending terminal and/or receiving terminal of a payment entity is unavailable due to network issues or connectivity issues, the connectivity check message may be automatically sent to a subsequent payment entity upon expiry of a session allotted for the payment terminal or when the sending terminal and/or receiving terminal are available.

In an embodiment, the merchant terminal 104 may display a prompt for processing the payment transaction further. For example, upon receiving a successful connectivity information, the merchant terminal 104 may display a prompt including a transaction option for the cardholder 110. If the cardholder 110 provides a selection input on the transaction option, it indicates to the merchant terminal 104 that the cardholder 110 provides consent for processing the payment transaction further. The acquirer server 112 sends the payment transaction request stored in the database to the subsequent payment entity (e.g., the payment server 116) based on the predefined sequence flow for the payment transaction. The payment server 116 forwards the payment transaction request to the issuer server 114 that authorizes the payment transaction. The payment server 116 may process and settle the transaction amount between issuer server 114 and the acquirer server 112. Additionally or optionally, the issuer server 114 may send a notification of payment transaction successful/failure to the merchant terminal 104 for notifying the cardholder 110 about the payment transaction via a network 120. The network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

It shall be noted that the prompt for processing the payment transaction further may also be displayed upon receiving the connectivity failure information and the cardholder 110 can decide if he/she intends to continue with processing the payment transaction. The acquirer server 112 is associated with a financial institution normally called as a "merchant bank" or the "acquiring bank" or "acquirer bank" or simply "acquirer", in which the merchant 102 may have a merchant account. The acquirer server 112 is associated with the acquirer bank. Using the payment network 118, the acquirer server 112 will communicate with the issuer server 114 to determine whether the cardholder's account is in good standing and whether the transaction amount of the purchase is covered by the cardholder's available account balance. Based on these determinations, authorization of the transaction is declined or accepted. When the authorization is accepted, the available balance of cardholder's account is decreased.

Some non-exhaustive example embodiments of determining connectivity information of the one or more payment entities are described with reference to FIGS. 2-13.

Figure 2:
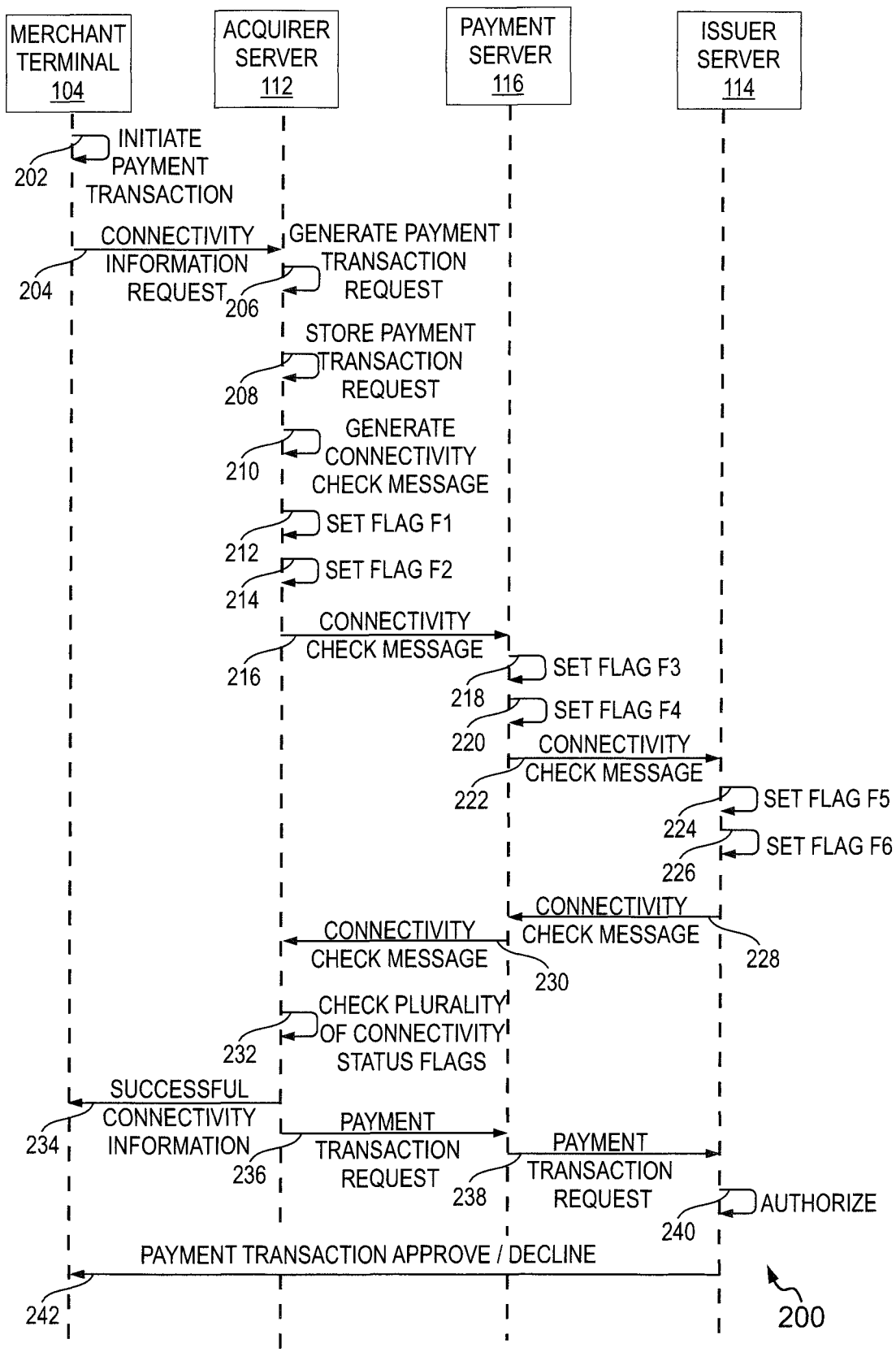
FIG. 2 illustrates a sequence flow diagram representing a method for checking network connectivity before performing a payment transaction, in accordance with an example embodiment.

Referring now to FIG. 2, a sequence flow diagram 200 representing a method for checking network connectivity before performing a payment transaction is illustrated in accordance with an example embodiment.

At 202, the cardholder 110 initiates a payment transaction at the merchant terminal 104. The agent 108 at the merchant terminal 104 swipes the payment card 109 at the merchant terminal 104 to read the payment card information. In some example embodiments, the merchant terminal 104 may also be a merchant facilitated e-commerce website interface (online store) running on the cardholder device 122 associated with the cardholder 124. During check-out from the online store, the cardholder 124 provides the payment card information of an associated payment card on a payment page. For example, the cardholder 124 may provide information such as, payment card type, payment card number, name of the cardholder 124, validity of the payment card and any other credentials requested by the payment page.

At 204, the merchant terminal 104 sends a connectivity information request to the acquirer server 112. The merchant terminal 104 displays a prompt including an option to determine the connectivity information of one or more payment entities in the payment network 118 that may be involved in the payment transaction for the cardholder 110. Some examples of the one or more payment entities include, but are not limited to the, acquirer server 112, the issuer server 114 and the payment server 116. The option provides the cardholder 110 a benefit of checking for the network connectivity before performing the payment transaction so as to ensure that the payment transactions do not fail. When the cardholder 110 provides a selection input for the option, the connectivity information request is sent to the acquirer server 112. The connectivity information request includes the payment card information, the selection input for the option and optionally a payment amount for the payment transaction.

At 206, the acquirer server 112 generates a payment transaction request based on the connectivity information request. The payment transaction request includes the payment card information and optionally the payment amount for the payment transaction. At 208, the acquirer server 112 stores the payment transaction request.

At 210, the acquirer server 112 generates a connectivity check message. The connectivity check message is communicated among the one or more payment entities in the payment network 118 to determine the connectivity information prior to performing the payment transaction. The connectivity check message includes an identifier, for example, alphabet 'D' indicating the connectivity check message, a plurality of connectivity status flags for the one or more payment entities associated with the payment network 118 and a primary account number of the cardholder 110. In at least one example embodiment, each payment entity may be associated with two flags, for example, a flag for a sending terminal of the payment entity and a flag for a receiving terminal of the payment entity. As an example, the acquirer server 112 may be associated with flags F1, F2 for a receiving terminal R1 of the acquirer server 112 and a sending terminal S1 of the acquirer server 112, respectively; the payment server 116 may be associated with flags F3, F4 for a receiving terminal R2 of the payment server 116 and a sending terminal S2 of the payment server 116, respectively; and the issuer server 114 may be associated with flags F5, F6 for a receiving terminal R3 of the issuer server 114 and a sending terminal S3 of the issuer server 114, respectively. In at least one example embodiment, the flags F1, F2, F3, F4, F5 and F6 are set to a failure state, for example, 'Y' or '0' prior to communicating with the one or more payment entities in the payment network 118.

At 212, the acquirer server 112 sets the flag F1 to a success state/failure state. The acquirer server 112 is configured to check the receiving terminal R1 upon receiving the connectivity information request. If the receiving terminal R1 is capable of receiving messages, then the flag F1 is set to the success state. For example, the flag F1 is changed from the failure state 'Y' to the success state 'X'.

At 214, the acquirer server 112 sets the flag F2 to a success state/failure state. The acquirer server 112 is configured to check the sending terminal S1 upon receiving the connectivity information request. If the sending terminal R1 is capable of sending messages, then the flag F2 is set to the success state. For example, the flag F2 is changed from the failure state 'Y' to the success state 'X'.

At 216, the acquirer server 112 sends the connectivity check message to the payment server 116. At 218, the payment server 116 sets the flag F3 to a success state/failure state. If the payment server 116 receives the connectivity check message, the payment server 116 ensures that the receiving terminal of the payment server 116 is able to communicate with the acquirer server 112 via the payment network 118. Therefore, the payment server 116 sets the flag F3 associated with the receiving terminal R2 to the success state. Alternatively, if the receiving terminal R2 either does not receive the connectivity check message within a time frame due to network connectivity issues, the flag F3 remains in the failure state 'Y'.

At 220, the payment server 116 sets the flag F4 to a success state/failure state. The payment server 116 checks the sending terminal S2 to determine if the payment server 116 is able to communicate with the issuer server 114. When the payment server 116 determines that the sending S2 terminal of the payment server 116 is able to communicate with the issuer server 114 via the payment network 118, the payment server 116 sets the flag F4 to the success state 'X'. Alternatively, if the sending terminal S2 is not able to communicate within a time frame due to network connectivity issues, the flag F4 remains in the failure state 'Y'.

At 222, the payment server 116 sends the connectivity check message to the issuer server 114. At 224, the issuer server 114 sets the flag F5 to a success state/failure state. If the issuer server 114 is able to communicate with the payment server 116 and receive the connectivity check message via the receiving terminal R3, the issuer server 114 sets the flag F5 to the success state.

At 226, the issuer server 114 sets the flag F6 to a success state/failure state. Similarly, if the issuer server 114 is able to communicate with the payment server 116 and send the connectivity check message via the sending terminal S3, the flag F6 is set to the success state.

At 228, the issuer server 114 sends the connectivity check message to the payment server 116. At 230, the payment server 116 forwards the connectivity check message to the acquirer server 112.

At 232, the acquirer server 112 checks the plurality of connectivity status flags (F1, F2, F3, F4, F5, F6) in the connectivity check message. The acquirer server 112 checks each connectivity status flag to determine if each of the plurality of connectivity status flags is set with the success state/failure state. In an embodiment, if one of the connectivity status flag among the plurality of connectivity status flags is set to a failure state, then a failure in network connectivity is determined by the acquirer server 112. Alternatively, if the plurality of connectivity status flags (F1, F2, F3, F4, F5, F6) in the connectivity check message are in the success state, then the acquirer server 112 determines that there is proper network connectivity between the one or more payment entities in the payment network 118.

At 234, the acquirer server 112 sends a successful connectivity information to the merchant terminal 104 upon determining that each of the plurality of connectivity status flags (F1, F2, F3, F4, F5, F6) is set with the success state in the connectivity check message. Alternatively, if the acquirer server 112 detects one of the connectivity status flag in the failure state, a failure connectivity information may be displayed in the merchant terminal 104. In some example embodiments, a transaction option may be displayed as a prompt for the cardholder 110 to receive consent of the cardholder 110 so as to proceed with the payment transaction.

At 236, the acquirer server 112 sends the payment transaction request to the payment server 116. When the cardholder 110 provides a selection input on the transaction option, the payment transaction request stored in the acquirer server 112 is sent to a subsequent entity (e.g., the payment server 116) based on the predefined sequence. At 238, the payment server 116 forwards the payment transaction request to the issuer server 114. At 240, the issuer server 114 authorizes the payment transaction request. The issuer server 114 verifies the payment card information of the cardholder 110, approves the payment transaction request, and processes the payment from an issuer account of the cardholder 110 to an acquirer account of the merchant 102 via the payment server 116. Details of the payment transaction from the issuer account to the acquirer account (also referred to as 'a merchant account') are not provided herein in detail for the sake of brevity. For instance, in a non-limiting example, upon receiving a correct fixed character length PIN or a fixed character length one-time password (OTP) from the cardholder 110, the cardholder 110 is validated and authenticated by the issuer server 114 and the transaction amount is settled between the issuer account and the acquirer account via the payment server 116.

At 242, the issuer server 114 sends a notification comprising a payment transaction approval/decline message to the merchant terminal 104.

Figure 3A:
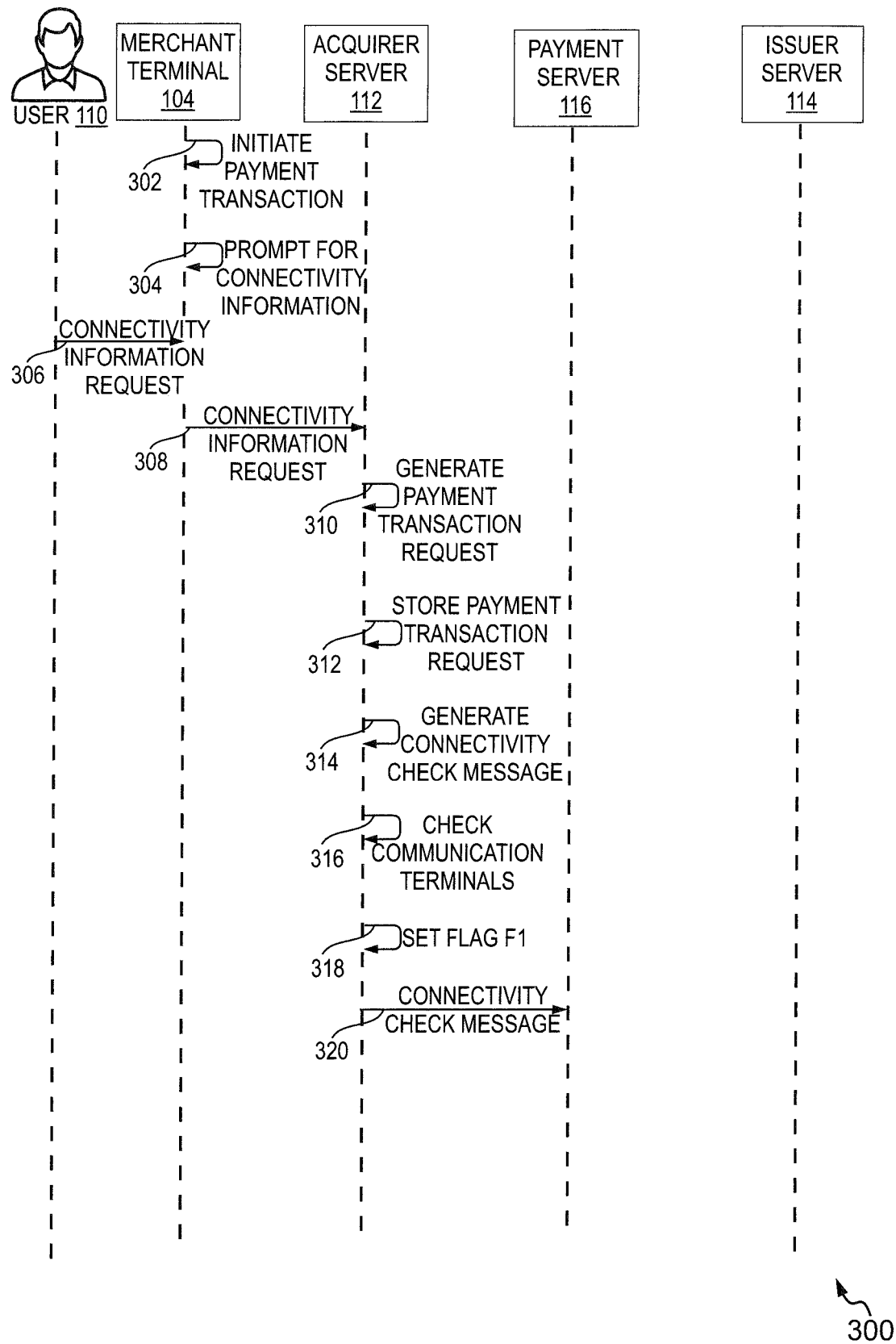
FIGS. 3A-3B illustrate a sequence flow diagram representing a method for checking network connectivity before performing a payment transaction, in accordance with another example embodiment.
Figure 3B:
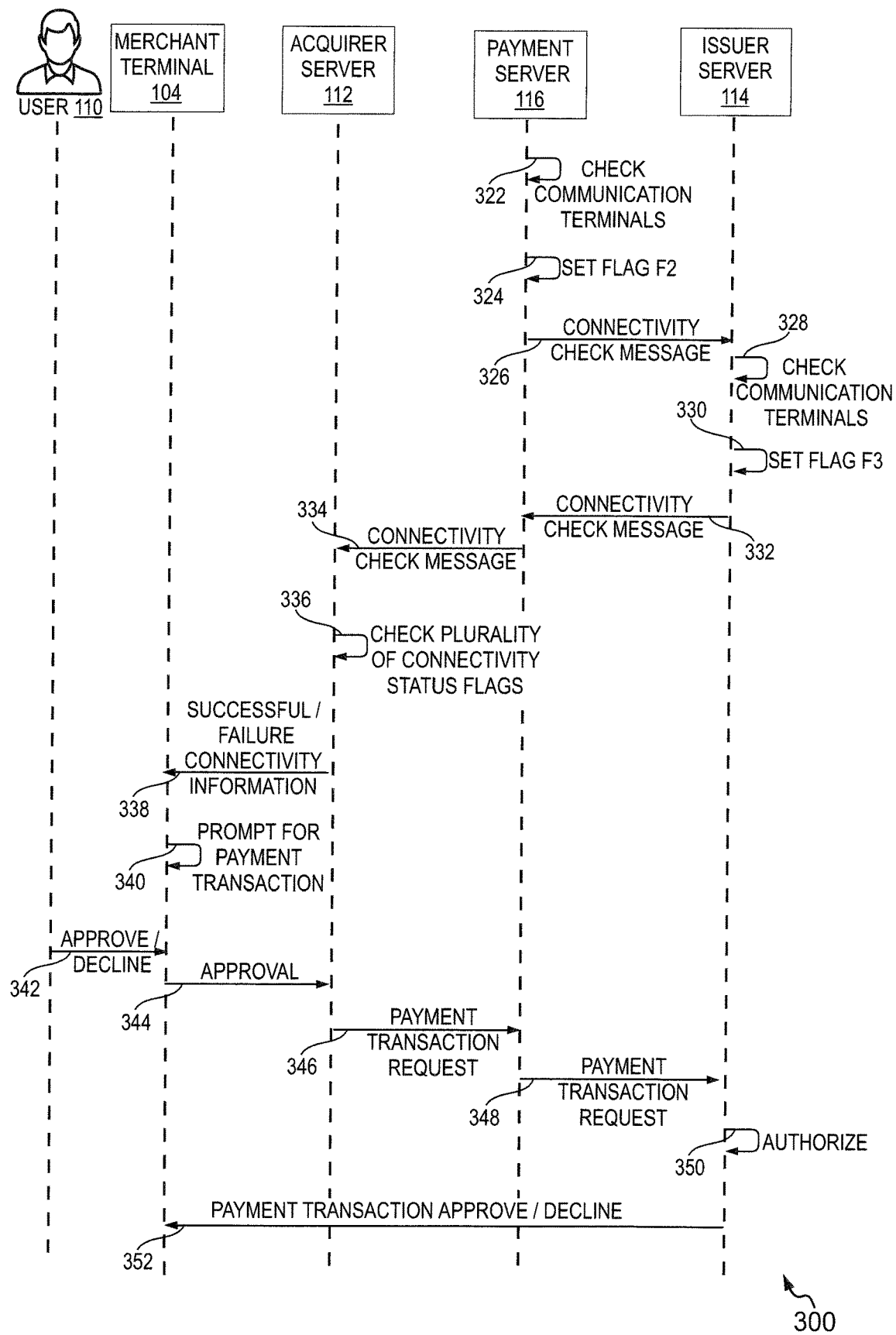

Referring now to FIGS. 3A-3B, a sequence flow diagram 300 representing a method for checking network connectivity before performing a payment transaction at the merchant terminal 104 is illustrated in accordance with another example embodiment. The merchant terminal 104 may also be a merchant facilitated e-commerce website interface (online store) running on a computing device, such as, the cardholder device 122 associated with the cardholder 124. The cardholder 110 may purchase goods/services at the merchant 102 and pay for the goods/services at the merchant terminal 104 using the payment card 109.

At 302, the cardholder 110 initiates a payment transaction at the merchant terminal 104. The cardholder 110/agent 108 may swipe the payment card at the merchant terminal 104 to read payment card information. Alternatively, during checkout from the online store of the merchant 102, the cardholder 124 provides the payment card information of an associated payment card on a payment page. For example, the cardholder 124 may provide information such as, payment card type, payment card number, name of the cardholder 124, validity of the payment card and any other credentials requested by the payment page.

At 304, the merchant terminal 304 displays a prompt including an option for checking connectivity information to the cardholder 110. At 306, the cardholder 110 requests for the connectivity information of the one or more payment entities in the payment network 118. The cardholder 110 provides a selection input on the option for checking the connectivity information.

At 308, the merchant terminal 104 sends a connectivity information request to the acquirer server 112. When the cardholder 110 provides a selection input on the option for checking the connectivity information, the connectivity information request is generated by the merchant terminal 104. The connectivity information request may include the payment card information and optionally a transaction amount for the goods/services.

At 310, the acquirer server 112 generates a payment transaction request based on the connectivity information request. At 312, the acquirer server 112 stores the payment transaction request.

At 314, the acquirer server 112 generates a connectivity check message. The connectivity check message includes an identifier indicating it to be the connectivity check message and not the payment transaction request. Additionally, the connectivity check message includes a plurality of connectivity status flags. In some example embodiments, each payment entity is associated with one connectivity status flag. For example, the acquirer server 112 is associated with a flag F1, the payment server 116 is associated with a flag F2 and the issuer server 114 is associated with a flag F3. The flags F1, F2 and F3 can be set to a success state/failure state by respective payment entities upon determining if they are able to effectively communicate with other payment entities. For example, flag F1 is set by the acquirer server 112, if the acquirer server 112 is able to communicate with the merchant terminal 104 and the payment server 116.

At 316, the acquirer server 112 checks its communication terminals. If the acquirer server 112 is able to communicate with other payment entities, for example, the merchant terminal 104 and the payment server 116. In other words, if the acquirer server 112 is capable of sending and receiving messages from other payment entities in the payment network 118.

At 318, the acquirer server 112 sets the flag F1 to a success state/failure state. The acquirer server 112 sets the flag F1 to the success state if the acquirer server 112 is able to communicate with other payment entities in the payment network 118.

At 320, the acquirer server 112 sends the connectivity check message to the payment server 116. At 322, the payment server 116 checks its communication terminals. For example, the payment server 116 checks if it can send and receive the connectivity check message. More specifically, the payment server 116 checks an associated sending terminal and a receiving terminal. At 324, the payment server 116 sets the flag F2 to a success state/failure state. The payment server 116 sets the flag F2 based on checking the sending terminal and the receiving terminal.

At 326, the payment server 116 sends the connectivity check message to the issuer server 114. At 328, the issuer server 114 checks its communication terminals. Similarly, the issuer server 114 checks the communication terminals, a sending terminal and a receiving terminal of the issuer server 114. At 330, the issuer server 114 sets the flag F3 to a success state/failure state upon checking the communicating terminals of the issuer server 114.

At 332, the issuer server 114 sends the connectivity check message to the payment server 116. At 334, the payment server 116 forwards the connectivity check message to the acquirer server 112. At 336, the acquirer server 112 checks the plurality of connectivity status flags (F1, F2, F3) in the connectivity check message. The acquirer server 112 checks each connectivity status flag to determine if each of the plurality of connectivity status flags is set with the success state/failure state. In an embodiment, if one of the connectivity status flag among the plurality of connectivity status flags is set to a failure state, then a failure in network connectivity is determined by the acquirer server 112. Alternatively, if the plurality of connectivity status flags (F1, F2, F3, F4, F5, F6) in the connectivity check message are in the success state, then the acquirer server 112 determines that there is proper network connectivity between the one or more payment entities in the payment network 118.

At 338, the acquirer server 112 sends a successful connectivity information to the merchant terminal 104 upon determining that each of the plurality of connectivity status flags (F1, F2, F3) is set with the success state in the connectivity check message.

At 340, the merchant terminal 104 displays a prompt including a transaction option to initiate the payment transaction to the cardholder 110. The cardholder 110 is provided with the transaction option to proceed with payment transaction. At 342, the cardholder 110 may provide a selection input to approve further processing of the payment transaction.

At 344, upon receiving an approval from the cardholder 110, the merchant terminal 104 sends the approval for the transaction option to the acquirer server 112. At 346, the acquirer server 112 sends the payment transaction request to the payment server 116. At 348, the payment server 116 forwards the payment transaction request to the issuer server 114. At 350, the issuer server 114 authorizes the payment transaction request. For example, the issuer server 114 verifies if a balance amount in an issuer account of the cardholder 110 is sufficient for performing the payment transaction. At 352, the issuer server 114 sends a notification comprising a payment transaction approval/decline message to the merchant terminal 104.

Figure 4A:
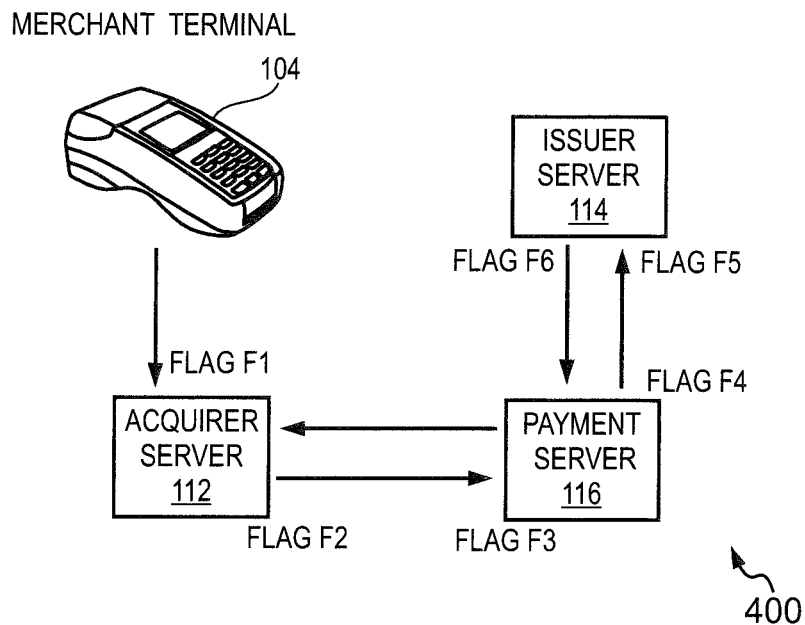
FIG. 4A illustrates a sequence flow of a connectivity check message for determining connectivity information of one or more entities in the payment network based on a predefined sequence of a payment transaction flow, in accordance with an example embodiment.

FIG. 4A illustrates a sequence flow 400 of a connectivity check message for determining a connectivity information of one or more entities in the payment network 118 based on a predefined sequence of a payment transaction flow, in accordance with an example embodiment. In an example embodiment, each payment entity in the payment network 118 includes a sending terminal and a receiving terminal. For example, the acquirer server 112 includes a sending terminal S1 and a receiving terminal R1, the payment server 116 includes a sending terminal S2 and a receiving terminal R2 and the issuer server 114 includes a sending terminal S3 and a receiving terminal R3. The connectivity check message includes a plurality of connectivity status flags F1, F2, F3, F4, F5, F6 for determining the connectivity information of the payment entities, the acquirer server 112, the payment server 116, the issuer server 114 in the payment network 118. In this example representation, each sending terminal and receiving terminal of a payment entity is associated with a connectivity status flag. As shown, the receiving terminal R1 of the acquirer server 112 is associated with the flag F1, the sending terminal S1 of the acquirer server 112 is associated with the flag F2, the receiving terminal R2 of the payment server 116 is associated with the flag F3, the sending terminal S2 of the payment server 116 is associated with the flag F4, the receiving terminal R3 of the issuer server 114 is associated with the flag F5 and the sending terminal S3 of the issuer server 114 is associated with the flag F6.

In an embodiment, the acquirer server 112 generates the connectivity check message for the one or more payment entities upon receiving a connectivity check request from a cardholder via the merchant terminal 104. The acquirer server 112 generates the connectivity check message with the plurality of connectivity status flags F1, F2, F3, F4, F5, and F6. When the receiving terminal R1 of the acquirer server 112 receives the connectivity check request, the acquirer server 112 ascertains that the receiving terminal R1 of the acquirer server 112 is able to communicate properly and thereby sets the flag F1 to a success state. The flag F2 is set to the success state 'X' by the acquirer server 112 when it determines that the sending terminal S1 is able to transmit the connectivity check message to the payment server 116. Similarly, when the receiving terminal R2 of the payment server 116 receives the connectivity check message, the payment server 116 sets the flag F3 to a success state and when the payment server 116 sends the connectivity check message, it sets the flag F4 if the payment server 116 is able to send the connectivity check message to the issuer server 114. In a similar fashion, the issuer server 114 sets the flags F5 and F6 of the sending terminal S3 and the receiving terminal R3 upon successfully receiving the connectivity check message from the payment server 116 and upon successfully sending the connectivity check message to the payment server 116.

Figure 4B:
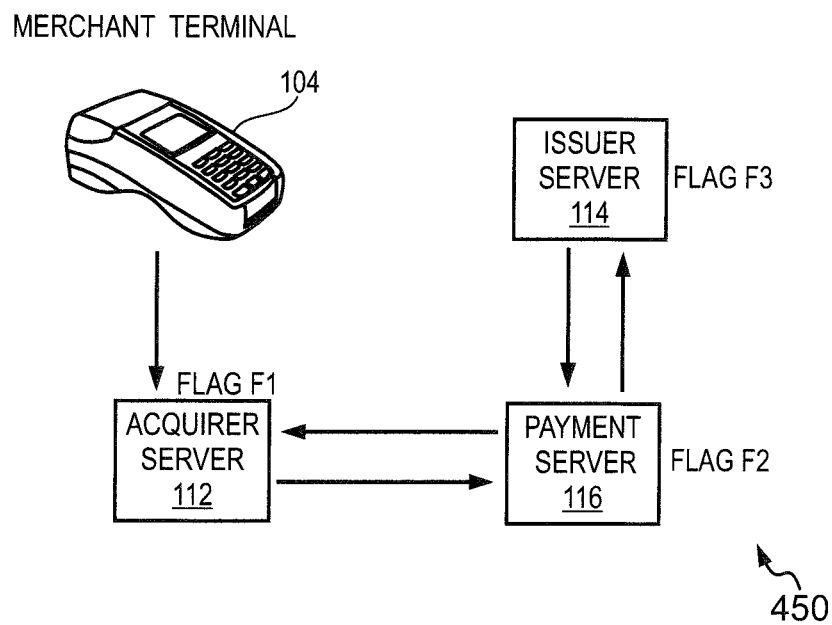
FIG. 4B illustrates a sequence flow of a connectivity check message for determining connectivity information of one or more entities in the payment network based on a predefined sequence of a payment transaction flow, in accordance with another example embodiment.

Referring now to FIG. 4B illustrates a sequence flow 450 of a connectivity check message for determining a connectivity information of one or more entities in the payment network 118 based on a predefined sequence of a payment transaction flow is illustrated in accordance with another example embodiment. The connectivity check message is generated by a server system or a payment entity in response to a connectivity information request received from a cardholder via the merchant terminal 104. In this example representation each payment entity is associated with one connectivity status flag. For example, the acquirer server 112 is associated with a connectivity status flag F1, the payment server 116 is associated with a connectivity status flag F2 and the issuer server 114 is associated with a connectivity status flag F3. The connectivity check message includes an identifier indicating the connectivity check message followed by the flags F1, F2, F3, respectively. In an embodiment, the flags F1, F2, F3 are preset to a failure state in the connectivity check message when they are initially generated.

In an embodiment, each payment entity, the acquirer server 112, the payment server 116 and the issuer server 114 are configured to set a corresponding connectivity status flag when they successfully communicate the connectivity check message to a subsequent payment entity based on a predefined sequence in the payment transaction flow. Assuming, the connectivity information request is received by the acquirer server 112 from the merchant terminal 104, the acquirer server 112 generates the connectivity check message. If the acquirer server 112 determines that it can communicate with other payment entities in the payment network 118, for example, receive from the merchant terminal 104 and send to the payment server 116, the acquirer server 112 can set the associated connectivity status flag F1 to a success state 'X' or '1'. Thereafter, the acquirer server 112 sends the connectivity check message to the next payment entity, for example, the payment server 116 based on the predefined sequence in the payment sequence flow. Similarly, the payment server 116 sets the corresponding flag F2 to a success state or retains the failure state based on determining if the payment server 116 is able to communicate with other payment entities in the payment network 118, for example, receive the connectivity check message from the acquirer server 112 and sends the connectivity check message to the issuer server 114. In a similar technique, the issuer server 114 sets the flag F3 based on its ability to communicate with other payment entities (e.g., the payment server 116).

In at least one example embodiment, the payment entity (e.g., the acquirer server 112) on receiving the connectivity check message that was initially generated and sent by the acquirer server 112, checks the flags F1, F2, F3. If all the flags F1, F2, F3 are set to a success state, the acquirer server 112 determines that network connectivity between the one or more payment entities in the payment network 118 is good and the payment transaction can be further processed. In some example embodiments, the acquirer server 112 sends a notification including a successful connectivity information to the cardholder 110 via the merchant terminal 104.

FIG. 5A illustrates an example representation of a UI 500 displayed to the cardholder 110/124 on the merchant terminal 104/cardholder device 122 providing an option for determining a connectivity information of one or more entities in the payment network 118 prior to performing a payment transaction, in accordance with an example embodiment. The UI 500 may be presented to the cardholder 110 on swiping the payment card 109 at the merchant terminal 104 or when the cardholder 124 is redirected to a payment page of the e-commerce website hosted by the merchant 102 during checkout via the cardholder device 122.

The UI 500 is depicted to display payment information 502 including fields such as a transaction amount (shown as 'PAYMENT AMOUNT'), a payment card identifier of the cardholder (shown as 'PAYMENT CARD NO'), a payment card type (shown as 'PAYMENT CARD TYPE') and a name of the cardholder 110 (shown as 'CARDHOLDER NAME'). The agent 108 may provide the payment amount in the merchant terminal 104. The other fields in the payment information 502 are filled up with data based on the payment card information of the cardholder 110. If the cardholder 110 swipes his/her payment card at the merchant terminal 104, the payment card information is automatically read from the payment card 109. If the cardholder 124 is performing the payment transaction online via the payment page, the cardholder 124 manually enters the payment card information. The UI 500 further provides an option 504 associated with a label 'CHECK NETWORK CONNECTIVITY'. The cardholder 110/124 can provide a selection input on the option 504 so as to determine connectivity information of the one or more payment entities in the payment network 118 prior to performing a payment transaction. When the cardholder 110/124 provides selection input on the option 504, the connectivity information is determined using one or more techniques described with reference to FIGS. 1 to 4A-4B.

Referring now to FIG. 5B, an example representation of a UI 520 displayed to the cardholder 110/124 on the merchant terminal 104/cardholder device 122 depicting a connectivity information of the one or more entities in the payment network 118 prior to performing the payment transaction is illustrated in accordance with an example embodiment. The UI 520 is displayed on the merchant terminal 104/cardholder device 122 upon determining the connectivity information of the one or more payment entities in the payment network 118. The connectivity information is determined when the cardholder 110/124 provides the selection input on the option 504 of the UI 500.

In this example representation, the UI 520 displays a text snippet 522 indicating that there is a problem with network connectivity. The connectivity information may be determined by a server system that communicates a connectivity check message among the one or more payment entities to determine if each payment entity is able to successfully communicate the connectivity check message. If any of the payment entity is unable to communicate the connectivity check message, the text snippet 522 is displayed to the cardholder 110/124. The UI 520 further includes an option 524 associated with text "TRY AGAIN", an option 526 associated with text "PROCEED" and an option 528 associated with text "CANCEL". When there exists a problem with the network connectivity, the cardholder 110/124 may be provided with an option of re-checking the network connectivity using the option 524. The cardholder 110/124 provides a selection input on the option 526, the merchant terminal 104 proceeds with the payment transaction. The cardholder 110/124 may cancel a present payment transaction by clicking on the option 528.

Referring now to FIG. 5C, an example representation of a UI 540 displayed to the cardholder 110 on the merchant terminal 104 depicting a connectivity information of the one or more entities in the payment network 118 prior to performing a payment transaction is illustrated in accordance with another example embodiment. The UI 540 is displayed on the merchant terminal 104/cardholder device 122 upon determining the connectivity information of the one or more payment entities in the payment network 118 when the cardholder 110/124 provides the selection input on the option 504 of the UI 500 or the option 524 in the UI 520.

In this example representation, the UI 540 displays a text snippet 542 indicating there exists good network connectivity for performing a payment transaction. The connectivity information may be determined by a server system that communicates a connectivity check message among the one or more payment entities to determine if each payment entity is able to successfully communicate the connectivity check message. If all the payment entities are able to communicate the connectivity check message, the text snippet 542 is displayed to the cardholder 110/124. The UI 540 further includes a transaction option 544 associated with text "PROCEED" and an option 546 associated with text "CANCEL". A selection input on the options 544 and 546 perform same functionality as those of the options 526 and 528 and have not been explained herein for the sake of brevity.

Figure 6A:
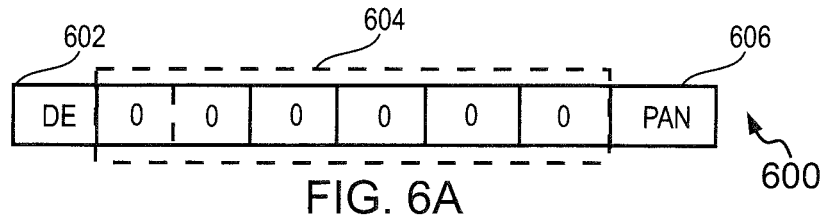
FIG. 6A illustrates an example representation of a connectivity check message generated at an acquirer server for determining connectivity information of the one or more entities in the payment network prior to performing a payment transaction, in accordance with an example embodiment.
Figure 6B:
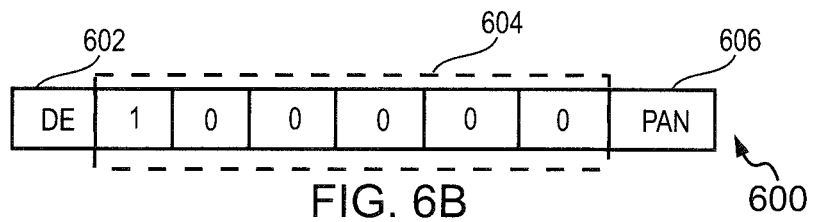
FIG. 6B illustrates an example representation of the connectivity check message at a receiving terminal of the acquirer server, in accordance with an example embodiment.

Referring now to FIG. 6A, an example representation of a connectivity check message 600 generated at a server system for determining a connectivity information of the one or more entities in the payment network 118 prior to performing a payment transaction is illustrated in accordance with an example embodiment. Some examples of the server system may include but not limited to the acquirer server 112, the payment server 116 and the issuer server 114. It shall be noted that the acquirer server 112 has been used for explaining the generation of the connectivity check message for exemplary purposes. However, it must be apparent to a person skilled in the art that the connectivity check message may be generated by any other server system.

In at least one example embodiment, the connectivity check message 600 includes an identifier field 602, a connectivity status flag field 604 and a cardholder identifier field 606. The identifier field 602 includes an identifier denoting the connectivity check message. The identifier may be an alphabet, a number or any combination of the above indicating the connectivity check message. The identifier field 602 is essential for the payment entities to identify the connectivity check message for determining the connectivity information and distinguish it from the payment transaction request. As shown in FIGS. 6A-6G, the identifier field 602 is associated with a text "DE" indicating the connectivity check message.

In this example representation, the connectivity status flag field 604 includes flags F1, F2, F3, F4, F5 and F6. The flag F1 is associated with a receiving terminal of the acquirer server 112, flag F2 is associated with a sending terminal of the acquirer server 112, flag F3 is associated with a receiving terminal of the payment server 116, flag F4 is associated with the sending terminal of the payment server 116, flag F5 is associated with the receiving terminal of the issuer server 114 and flag F6 is associated with the sending terminal of the issuer server 114. It shall be noted that the connectivity status flags are shown for exemplary purposes only and the field 604 may include lesser or more flags than the flags depicted here.

The flags F1, F2, F3, F4, F5 and F6 are initially preset to a failure state, herein indicated by '000000'. The failure state and the success state may be represented by distinct binary numbers, for example, status flag for the success state may be represented as '1', and '0' for the failure state. The connectivity status flag field 604 is followed by the cardholder identifier field 606 associated with text "PAN" indicating Personal Account Number (PAN). The field 606 includes a primary account number of the cardholder 110 that may be used to identify the issuer account of the cardholder 110. The connectivity check message is communicated among the one or more payment entities, for example, the acquirer server 112, the payment server 116 and the issuer server 114. Each payment entity is configured to set an associated connectivity status flag to a success state upon determining if the sending/receiving terminal is able to send/receive the connectivity check message.

Figure 6C:
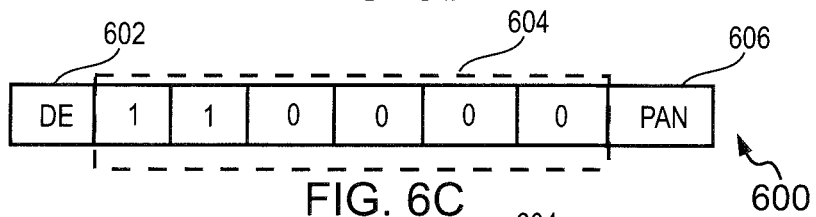
FIG. 6C illustrates an example representation of the connectivity check message at a sending terminal of the acquirer server, in accordance with an example embodiment.

In this example representation, the acquirer server 112 checks its receiving terminal and upon determining that the receiving terminal is able to communicate with other payment entities, more specifically receive messages such as, a connectivity information request from the merchant terminal 104, the acquirer server 112 sets the flag F1 (see, '100000' in FIG. 6B) to the success state (shown as '1') in the connectivity check message 600. Similarly, the acquirer server 112 checks its sending terminal and determines if the acquirer server 112 is capable of sending the connectivity check message 600 to the payment server 116. If the acquirer server 112 determines that the sending terminal is able to communicate with other payment entities (e.g., the payment server 116), the acquirer server 112 sets the flag F2 to the success state '1' (e.g., '110000') as shown in FIG. 6C. The acquirer server 112 then sends the connectivity check message 600 to the payment server 116.

Figure 6D:
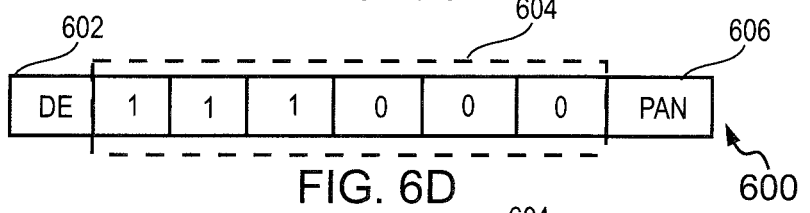
FIG. 6D illustrates an example representation of the connectivity check message at a receiving terminal of a payment server, in accordance with an example embodiment.
Figure 6E:
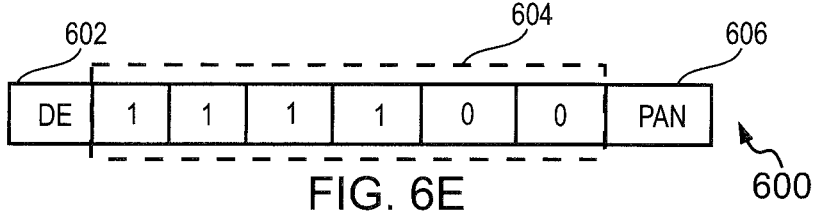
FIG. 6E illustrates an example representation of the connectivity check message at a sending terminal of the payment server, in accordance with an example embodiment.

As shown in FIG. 6D, the payment server 116 sets the flag F3 associated with the receiving terminal of the payment server 116 to the success state '1' (e.g., '111000') upon successfully receiving the connectivity check message 600. Additionally, the payment server 116 checks its sending terminal to determine if the connectivity check message 600 can be communicated to subsequent payment entity in the predefined sequence of the payment transaction flow. When the acquirer server 112 detects the sending terminal to be capable of communicating the connectivity check message, the payment server 116 sets the flag F4 to the success state '1' (e.g., (e.g., '111100') shown in FIG. 6E).

Figure 6F:
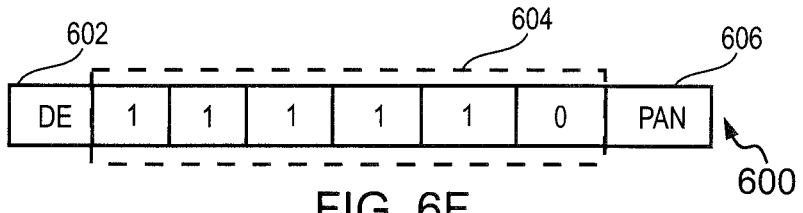
FIG. 6F illustrates an example representation of the connectivity check message at a receiving terminal of an issuer server, in accordance with an example embodiment.
Figure 6G:
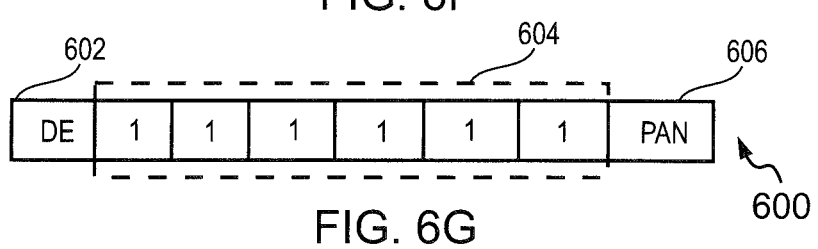
FIG. 6G illustrates an example representation of the connectivity check message at a sending terminal of the issuer server, in accordance with an example embodiment.

Referring now to FIG. 6F, when the issuer server 114 receives the connectivity check message 600 from the payment server 116 based on the predefined sequence, the issuer server 114 sets the flag F5 (e.g., '111110') associated with the receiving terminal of the issuer server 114. Similarly, the issuer server 114 checks its sending terminal and if the sending terminal is capable of communicating with the payment server 116, the issuer server 114 is configured to set the flag F6 to the success state '1' (e.g., '111111' shown in FIG. 6G). The connectivity check message is now relied to the payment server 116 and the payment server 116 forwards the connectivity check message to the acquirer server 112 based on the predefined sequence in the payment transaction flow. The acquirer server 112 checks the plurality of connectivity status flags F1, F2, F3, F4, F5 and F6 to determine the connectivity information as a successful connectivity or failure connectivity. It is noted that in the event of any failure of communication between any two entities associated with the payment network, at least one of the flags F1 through F6 will be set as '0' indicating connectivity failure in the payment network.

Figure 7:
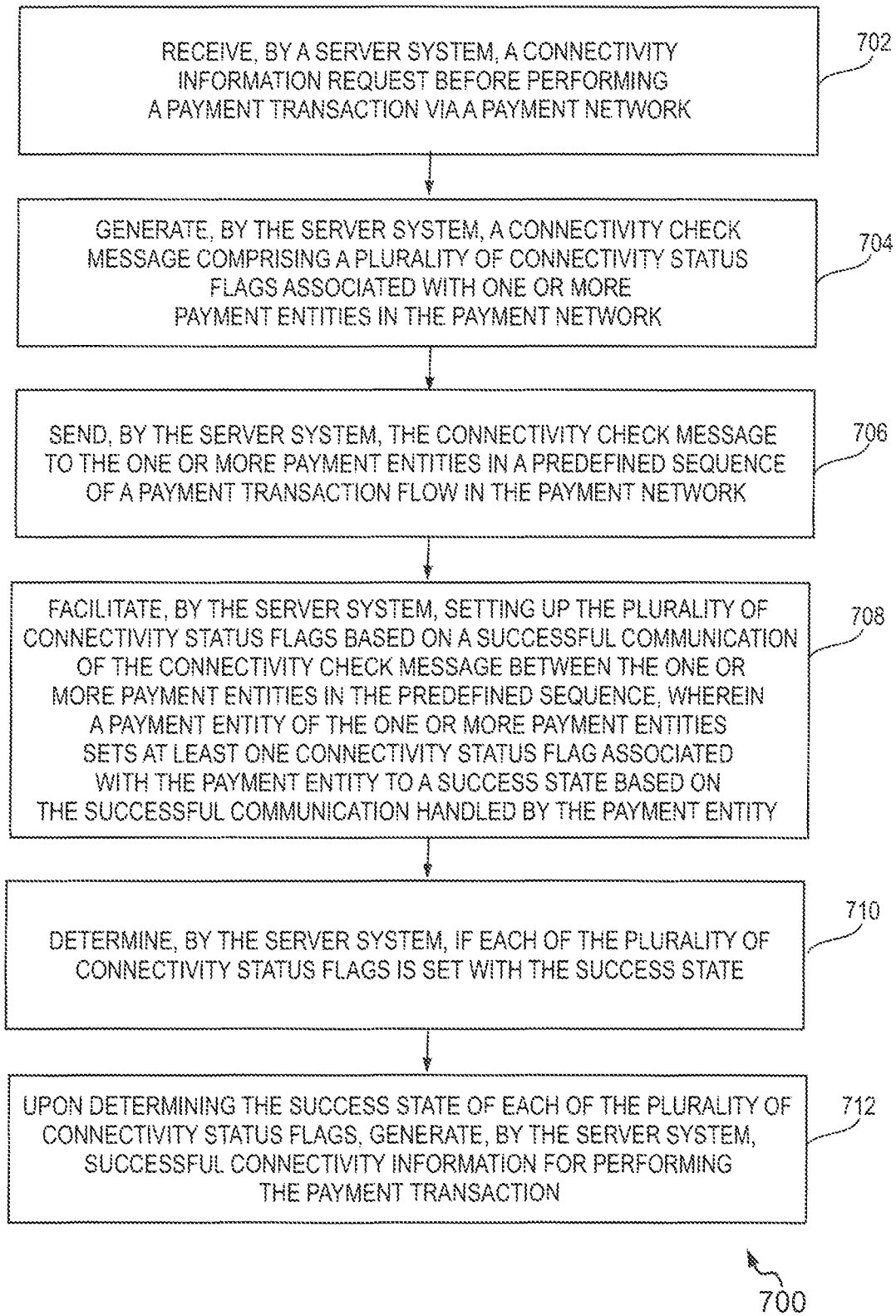
FIG. 7 illustrates a flow diagram of a method for determining network connectivity before performing a payment transaction, in accordance with an example embodiment.

Referring now to FIG. 7, a flow diagram of a method 700 for checking network connectivity before performing a payment transaction is illustrated in accordance with an example embodiment. The method 700 depicted in the flow diagram may be executed by a server system which may one of a payment entity. Operations of the flow diagram, and combinations of operation in the flow diagram, may be implemented by, for example, hardware, firmware, a processor, circuitry and/or a different device associated with the execution of software that includes one or more computer program instructions. The operations of the method 700 are described herein with help of the acquirer server 112. It is noted that the operations of the method 700 can be described and/or practiced by using a system other than the acquirer server 112, such as the payment server 116 or the issuer server 114. The method 700 starts at operation 702.

At operation 702, the method 700 includes receiving, by a server system, a connectivity information request before performing a payment transaction via a payment network. A cardholder may swipe his/her payment card at a merchant terminal for the goods/services purchased. The merchant terminal may also be a payment page facilitated by an e-commerce platform of an online store. If the payment transaction is for the online store, the cardholder provides payment card information during check out at the merchant terminal. Additionally, the cardholder is provided an option of determining the connectivity information of one or more payment entities in the payment network. This provides the cardholder a benefit of ensuring that the payment transaction does not fail due to poor/lack of network connectivity between the one or more payment entities. The connectivity information request may include the payment card information and optionally a transaction amount.

At operation 704, the method 700 includes generating, by the server system, a connectivity check message comprising a plurality of connectivity status flags associated with one or more payment entities in the payment network. The connectivity check message is generated in response to the connectivity information request from the merchant terminal. In some example embodiments, each payment entity may be associated with one connectivity status flag. For example, an acquirer server may be associated with a flag F1, a payment server may be associated with a flag F2 and an issuer server may be associated with a flag F3. In some example embodiments, each payment entity may be associated with two flags. As an example, a receiving terminal of the acquirer server may be associated with a flag F1 and a sending terminal of the acquirer server may be associated with a flag F2. The acquirer server is therefore associated with flags F1, F2. An example of the connectivity check message is shown and explained with reference to FIG. 6A.

At operation 706, the method 700 includes sending, by the server system, the connectivity check message to the one or more payment entities in a predefined sequence of a payment transaction flow in the payment network. The predefined sequence defines a sequence in flow of the connectivity check message between the payment entities. An example of the predefined sequence, any payment transaction flows from the merchant terminal to the acquirer, the acquirer to the payment server, the payment server to issuer who verifies transaction details and sends an acknowledgement to the payment server, the payment server relies the acknowledgement to the acquirer and the acquirer further notifies the merchant terminal.

At operation 708, the method 700 includes facilitating, by the server system, setting up the plurality of connectivity status flags based on a successful communication of the connectivity check message between the one or more payment entities in the predefined sequence. A payment entity of the one or more payment entities sets at least one connectivity status flag associated with the payment entity to a success state based on the successful communication handled by the payment entity. Each payment entity receives the connectivity check message and checks its terminals if the payment entity is able to communicate, for example, send and/or receive the connectivity check message. If the payment entity is able to communicate with other payment entity in the predefined sequence, the payment entity sets an associated connectivity status flag to the success state. Alternatively, if the payment entity is unable to communicate the connectivity check message, for example, due to issues in network connectivity, the payment entity retains the associated flag at the failure state. An example of changing states (success state/failure state) of the connectivity status flag based on the communication terminals is explained with reference to FIG. 6A-6G.

At operation 710, the method 700 includes determining, by the server system, if each of the plurality of connectivity status flags is set with the success state.

At operation 712, the method 700 includes upon determining the success state of each of the plurality of connectivity status flags, generating, by the server system, successful connectivity information for performing the payment transaction. For example, if all the connectivity status flags are set to the success state, the successful connectivity information is sent to the merchant terminal. Alternatively, if at least one flag remains in the failure state, a failure connectivity information is communicated to the merchant terminal.

The sequence of operations of the method 700 need not be necessarily executed in the same order as they are presented. Further, one or more operations may be grouped together and performed in form of a single step, or one operation may have several sub-steps that may be performed in parallel or in sequential manner.

Figure 8:
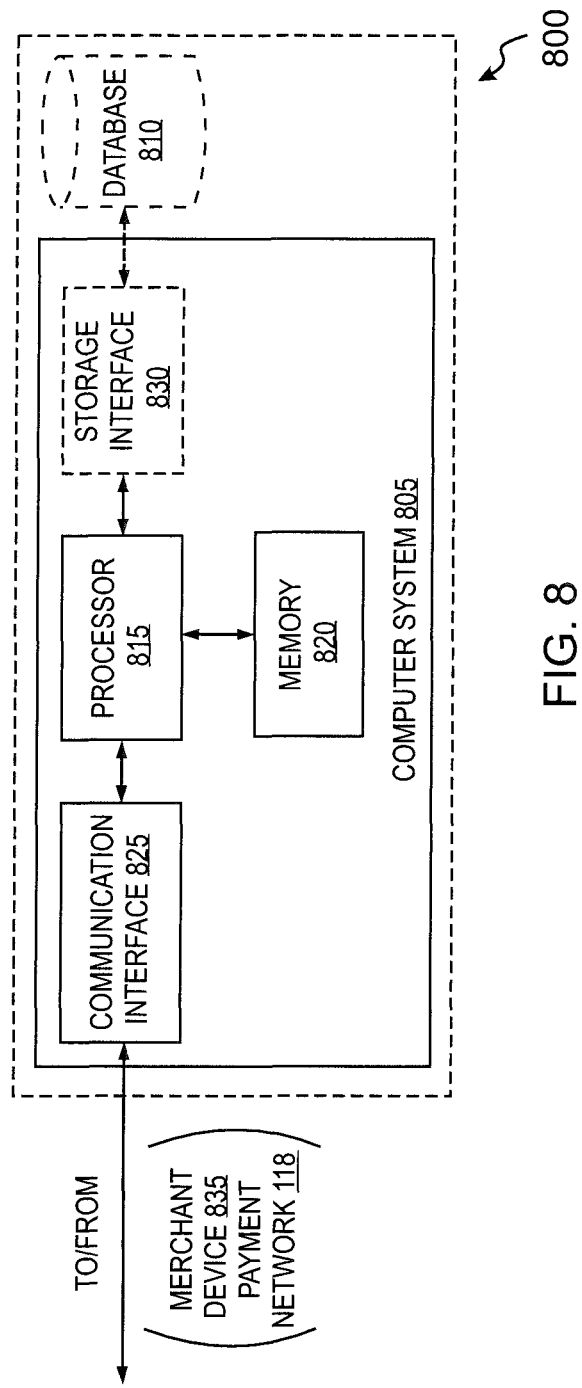
FIG. 8 is a simplified block diagram of the server system used for checking network connectivity before performing a payment transaction, in accordance with one embodiment of the present disclosure.

FIG. 8 is a simplified block diagram of a server system 800 used for checking network connectivity before performing a payment transaction, in accordance with one embodiment of the present disclosure. Examples of the server system 800 include, but are not limited to, the acquirer server 112, the issuer server 114 and the payment server 116. The server system 800 includes a computer system 805 and a database 810.

The computer system 805 includes at least one processor 815 for executing instructions. Instructions may be stored in, for example, but not limited to, a memory 820. The processor 815 may include one or more processing units (e.g., in a multi-core configuration).

The processor 815 is operatively coupled to a communication interface 825 such that the computer system 805 is capable of communicating with a remote device such as a merchant device 835 (e.g., the merchant terminal 104) or communicating with any entity within the payment network 118. For example, the communication interface 825 may receive the connectivity information request, where the connectivity information request is generated when the cardholder intends to determine connectivity information of one or more payment entities in the payment network 118.

The processor 815 may also be operatively coupled to the database 810. The database 810 is any computer-operated hardware suitable for storing and/or retrieving data, such as, but not limited to, transaction data generated as part of sales activities conducted over the bankcard network including data relating to merchants, account holders or customers, and purchases. The database 810 may also store information related to a plurality of user's issuer accounts. Each user account data includes at least one of a cardholder name, a cardholder address, an account number, MPIN, and other account identifier. The database 810 may also store information of a plurality of merchants, plurality of loyalty programs offered by the plurality of merchants, plurality of POS terminals installed at merchant facilities, such as POS ID, etc. The database 810 may also include instructions for settling transactions including merchant bank account information. The database 810 may include multiple storage units such as hard disks and/or solid-state disks in a redundant array of inexpensive disks (RAID) configuration. The database 810 may include a storage area network (SAN) and/or a network attached storage (NAS) system.

In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The processor 815 is configured to facilitate a transaction from an issuer account to an acquirer account (merchant account). The processor 815 is configured to perform one or more functions such as: receive the connectivity information request, generate a connectivity check message, communicate the connectivity check message of the one or more payment entities, facilitate setting of associated connectivity status flag by each payment entity, check the plurality of connectivity status flags and determine the connectivity information of the one or more payment entities. Thereafter, the processor 815 is further configured to generate a payment transaction request, authenticate the cardholder, verify payment card details and check available standing balance in an issuer account of the cardholder, among others. Thereafter, the processor 815 is configured to facilitate the transaction from the issuer account of the cardholder to the acquirer account of the merchant. The processor 815 may also be configured to notify the merchant terminal 104 of the transaction status via the communication interface 825.

Figure 9:
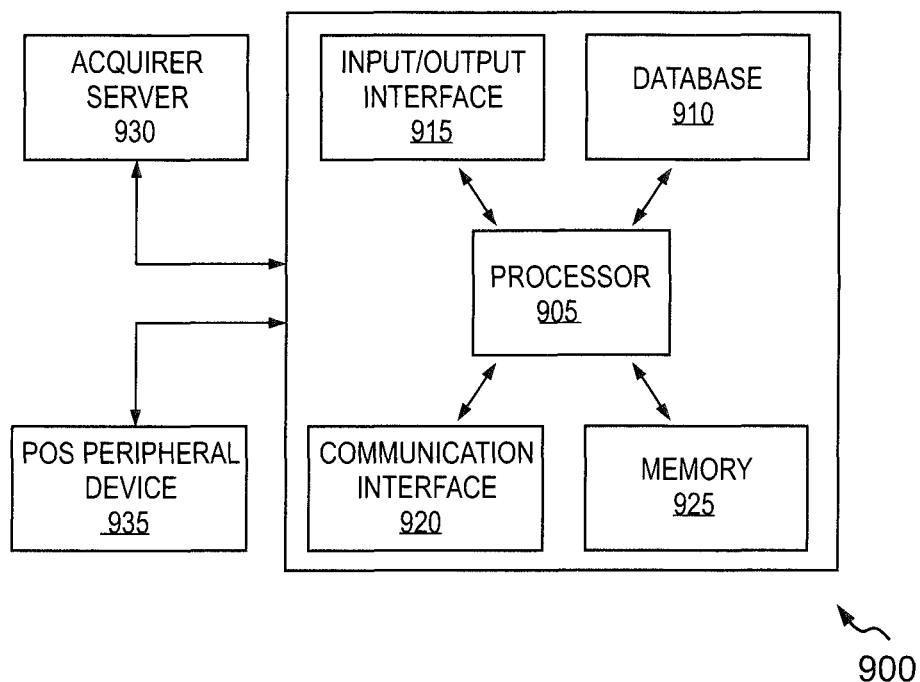
FIG. 9 is a simplified block diagram of a merchant terminal or a POS terminal used for facilitating the payment transaction with an option to check network connectivity before performing the payment transaction, in accordance with one embodiment of the present disclosure.

FIG. 9 is a simplified block diagram of a merchant terminal 900 used for facilitating the payment transaction with an option to check network connectivity before performing the payment transaction, in accordance with one embodiment of the present disclosure. The merchant terminal 900 as explained herein is only one example of the merchant terminal 104. In various embodiments, the merchant terminal 104 can be a merchant mobile phone, a kiosk, a PDA, a merchant facilitated e-commerce website interface running on a computing device and the like. The merchant terminal 900 includes at least one processor 905 communicably coupled to a database 910, an Input/Output (I/O) interface 915, a communication interface 920 and a memory 925. The components of the merchant terminal 900 provided herein may not be exhaustive, and that the merchant terminal 900 may include more or fewer components than that of depicted in FIG. 9. Further, two or more components may be embodied in one single component, and/or one component may be configured using multiple sub-components to achieve the desired functionalities. Some components of the POS terminal 900 may be configured using hardware elements, software elements, firmware elements and/or a combination thereof.

The I/O interface 915 is configured to receive inputs from and provide outputs to the end-user (i.e. the merchant and/or the customer) of the merchant terminal 900. For instance, the I/O interface 915 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 925 can be any type of storage accessible to the processor 905. For example, the memory 925 may include volatile or non-volatile memories, or a combination thereof. In some non-limiting examples, the memory 925 can be four to sixty four MegaBytes (MB) of Dynamic Random Access Memory ("DRAM") or Static Random Access Memory ("SRAM"). In addition, some examples may include supplementary flash memory installed via a PCMCIA slot.

The database 910 is capable of storing and/or retrieving data, such as, but not limited to, smart card insertions, user/customer information, merchant information, payment strings uniquely associated with each user, touch-screen key depressions, keypad key depressions, number of dots printed by the slip and roll printers, check read errors, card swipes, such as, plurality of number pad values of the payment card 300 and the like. Such information can be accessed by the processor 905 using the communication interface 920 to determine potential future failures and the like.

The merchant terminal 900 is capable of communicating with one or more POS peripheral devices such as a POS peripheral device 935 and external server system such as an acquirer server 930 (an example of the acquirer server 112) via the communication interface 920. The POS peripheral device 935 can provide functionality which is used by a consumer at a merchant facility, such as PIN entry, merchant transaction amount entry, clear text entry, signature capture, and the like. Some non-exhaustive examples of the POS peripheral device 935 include POS card reader device, barcode scanner, cash drawer, receipt printer, PIN pad, signature capture device, touchscreen, keyboard, portable data terminal, customer pole display and the like. In some embodiments, the POS terminal 900 may be mounted near a cash register at a check-out counter in the merchant facility, while the POS peripheral device 935 may be mounted on the check-out counter such that it is accessible to the users. In this way, both the merchant and the user/customer can interact with similar devices to process the payment transaction.

The communication interface 920 is further configured to cause display of user interfaces on the merchant terminal 900. In one embodiment, the communication interface 920 includes a transceiver for wirelessly communicating information to, or receiving information from, the acquirer server 930 or other suitable display device, and/or another type of remote processing device. In another embodiment, the communication interface 920 is capable of facilitating operative communication with the remote devices and a cloud server using Application Program Interface (API) calls. The communication may be achieved over a communication network.

The processor 905 is capable of sending the transaction request received from the end-user via the communication interface 920 to the acquirer server 930 for processing the transaction. For example, the processor 905 is configured to receive the payment card information of the cardholder 110, and the transaction amount via the POS peripheral device 935. The processor 905 can access the database 910 to retrieve the user information and merchant information that are required to be sent along with the transaction request to the acquirer server 112.

Additionally, the merchant terminal 900 can include an operating system and various software applications that can provide various functionality to the merchant terminal 900. For example, in some embodiments, the merchant terminal 900 is addressable with an Internet protocol and includes a browser application. In such embodiments, the processor 905 includes software adapted to support such functionality. In some embodiments, the processor 905 executes software to support network management. In particular, this capacity allows software to be downloaded to a plurality of such systems to provide new applications such as application for enabling payment string based payment transactions using POS terminals and/or updates to existing applications. The operating system and software application upgrades are distributed and maintained through communication to the merchant terminal 900 over the communication network.

Figure 10:
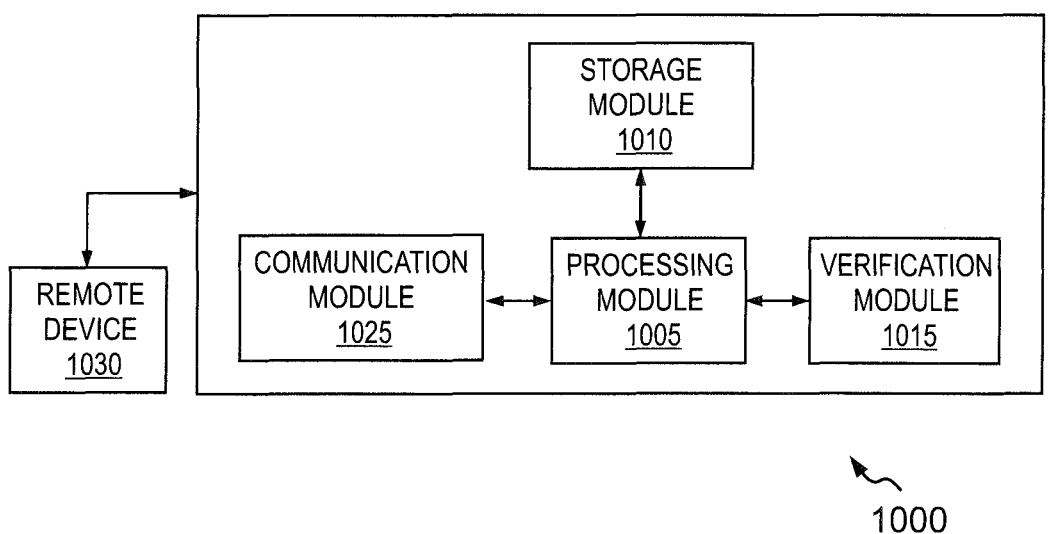
FIG. 10 is a simplified block diagram of an issuer server for checking network connectivity before performing a payment transaction, in accordance with one embodiment of the present disclosure.

FIG. 10 is a simplified block diagram of an issuer server 1000, in accordance with one embodiment of the present disclosure. The issuer server 1000 is an example of the issuer server 114 of FIG. 1 or may be embodied in the issuer server 114. The issuer server 1000 is associated with an issuer bank/issuer, in which a cardholder may have an account, which provides a payment card (e.g., the payment card 109). The issuer server 1000 includes a processing module 1005 operatively coupled to a storage module 1010, a verification module 1015 and a communication module 1025. The components of the issuer server 1000 provided herein may not be exhaustive and that the issuer server 1000 may include more or fewer components than that of depicted in FIG. 10. Further, two or more components may be embodied in one single component, and/or one component may be configured using multiple sub-components to achieve the desired functionalities. Some components of the issuer server 1000 may be configured using hardware elements, software elements, firmware elements and/or a combination thereof.

The storage module 1010 is configured to store machine executable instructions to be accessed by the processing module 1005. Additionally, the storage module 1010 stores information related to, contact information of the customer, bank account number, availability of funds in the account, payment card details, travel information of customers, and/or the like. This information is retrieved by the processing module 1005 for validation.

The processing module 1005 is configured to communicate with one or more remote devices such as a remote device 1030 using the communication module 1025 over a network such as the payment network 118 of FIG. 1. The examples of the remote device 1030 include the merchant terminal 104, the payment server 116, the acquirer server 112, and a central biometric server or other computing systems of issuer and the payment network 118 and the like. The communication module 1025 is capable of facilitating such operative communication with the remote devices and cloud servers using API (Application Program Interface) calls. The communication module 1025 is configured to receive a connectivity information request to determine if the communication terminals are able to communicate effectively. Additionally, the communication module 1025 is also configured to receive the payment transaction request from the merchant terminal 104 via the payment network 118.

The verification module 1015 is configured to verify and validate a customer (such as the cardholder 110/124), the payment card 109 associated with the cardholder 110 and a PIN of the payment card for approving the transaction. The verification module 1015 may also verify if an issuer account of the customer associated with the payment card have good standing balance. The communication module 1025 is configured to send notification of approval or decline of a payment transaction to the merchant terminal 104 via the payment network 118.

Figure 11:
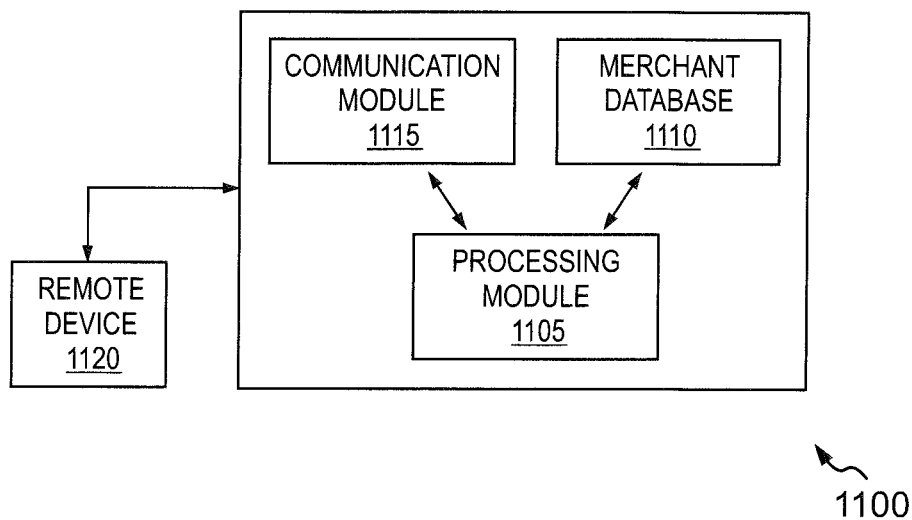
FIG. 11 is a simplified block diagram of an acquirer server for checking network connectivity before performing a payment transaction, in accordance with one embodiment of the present disclosure.

FIG. 11 is a simplified block diagram of an acquirer server 1100 for checking network connectivity before performing a payment transaction, in accordance with one embodiment of the present disclosure. The acquirer server 1100 is associated with an acquirer bank, which may be associated with a merchant (e.g., the merchant facility 102) at whose facility the cardholder 110 is purchasing goods. The merchant may have established an account to accept payment for purchase of goods from customers. The acquirer server 1100 is an example of the acquirer server 112 of FIG. 1 or may be embodied in the acquirer server 112. Further, the acquirer server 1100 is configured to facilitate transaction with the issuer server 114 using the payment network 118 of FIG. 1. The acquirer server 1100 includes a processing module 1105 communicably coupled to a merchant database 1110 and a communication module 1115. The components of the acquirer server 1100 provided herein may not be exhaustive, and that the acquirer server 1100 may include more or fewer components than that of depicted in FIG. 11. Further, two or more components may be embodied in one single component, and/or one component may be configured using multiple sub-components to achieve the desired functionalities. Some components of the acquirer server 1100 may be configured using hardware elements, software elements, firmware elements and/or a combination thereof.

The merchant database 1110 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The communication module 1115 is configured to receive a connectivity information request and the processing module 1105 is configured to generate a connectivity check message and a payment transaction request in response to the connectivity information request. Moreover, the merchant database 1110 is also configured to store the payment transaction request. The processing module 1105 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1105 may be configured to store and update the merchant parameters in the merchant database 1110 for later retrieval. In an embodiment, the communication module 1115 is capable of facilitating operative communication with a remote device 1120, such as, payment entities in the payment network 118. In some example embodiments, the processing module 1105 of the acquirer server 1100 is configured to check a plurality of connectivity status flags in the connectivity check message to determine the connectivity information.

Figure 12:
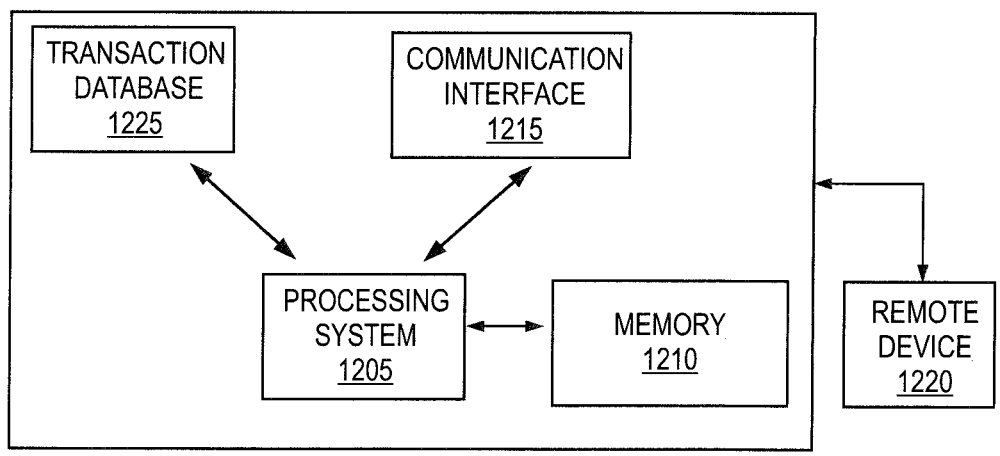
FIG. 12 is a simplified block diagram of a payment server used for checking network connectivity before performing a payment transaction, in accordance with one embodiment of the present disclosure.

FIG. 12 is a simplified block diagram of a payment server 1200 used for facilitating payment transactions to a merchant, in accordance with an embodiment of the present disclosure. The payment server 1200 is an example of the payment server 116 of FIG. 1. The payment network 118 may be used by the payment server 1200, the issuer server 1000 and the acquirer server 1100 as a payment interchange network. Examples of payment interchange network include, but not limited to, Mastercard® payment system interchange network. The payment server 1200 includes a processing system 1205 configured to extract programming instructions from a memory 1210 to provide various features of the present disclosure. The components of the payment server 1200 provided herein may not be exhaustive and that the payment server 1200 may include more or fewer components than that of depicted in FIG. 12. Further, two or more components may be embodied in one single component, and/or one component may be configured using multiple sub-components to achieve the desired functionalities. Some components of the payment server 1200 may be configured using hardware elements, software elements, firmware elements and/or a combination thereof.

Via a communication interface 1215, the processing system 1205 receives request from a remote device 1220 such as the acquirer server 1100. The request may be a payment transaction request from the acquirer server 1100. In one example, the processing system 1205 receives a connectivity check message from the acquirer server 1100 via the communication interface 1215. The communication may be achieved through API calls, without loss of generality. The payment server 1200 includes a database, such as a transaction database 1225. The transaction database 1225 may include transaction processing data, such as Issuer ID, country code, acquirer ID, among others. In addition, the processing system 1205 may store information of the merchant 102 and the cardholder 110/124.

Figure 13:
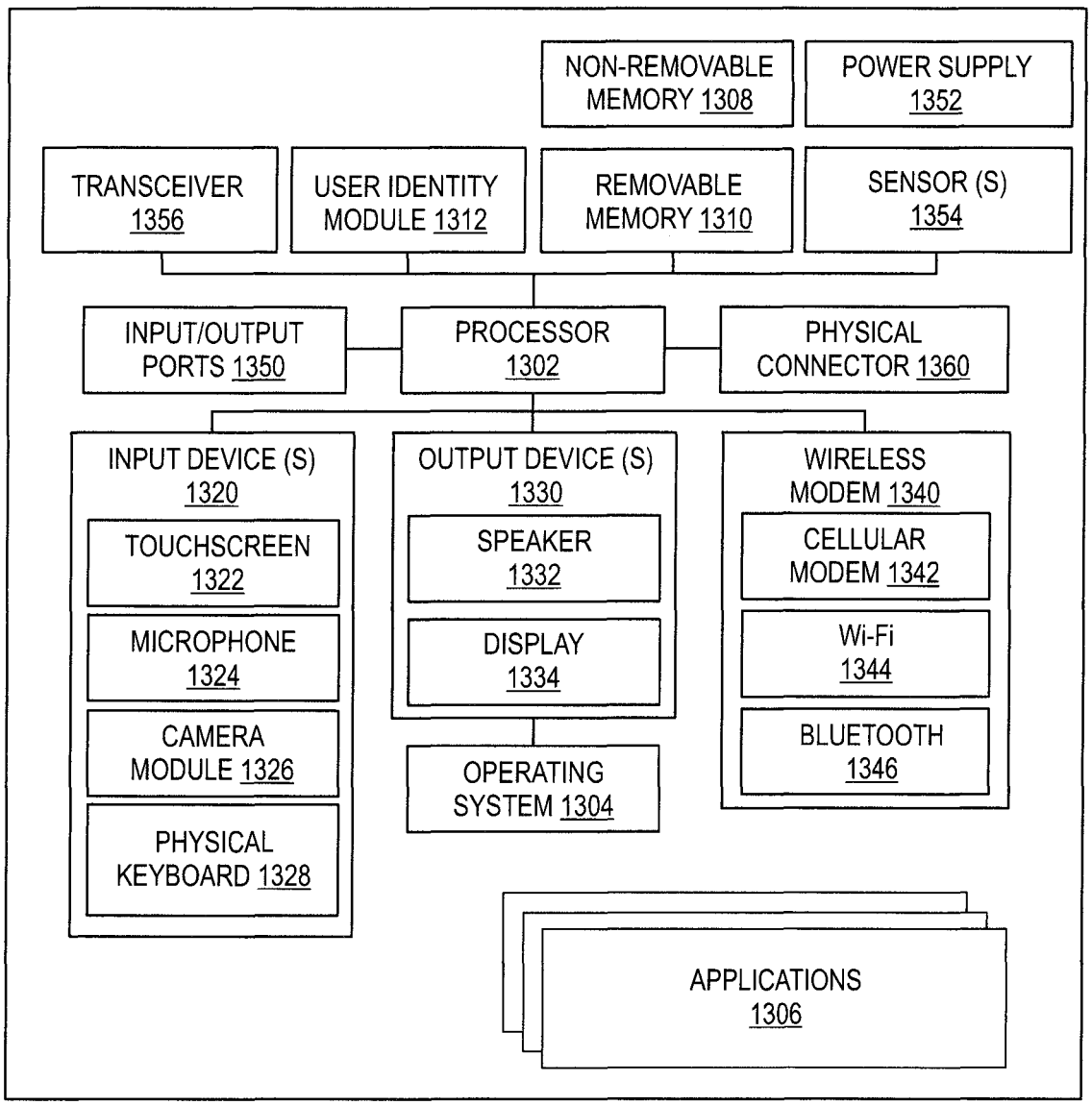
FIG. 13 shows a simplified block diagram of a user device, for example, a mobile phone capable of implementing at least some embodiments of the present disclosure.

FIG. 13 shows simplified block diagram of a user device 1300 for example a mobile phone or a desktop computer capable of implementing the various embodiments of the present disclosure. For example, the user device 1300 may correspond to the cardholder device 122 of FIG. 1. The user device 1300 is depicted to include one or more applications 1306.

It should be understood that the user device 1300 as illustrated and hereinafter described is merely illustrative of one type of device and should not be taken to limit the scope of the embodiments. As such, it should be appreciated that at least some of the components described below in connection with that the user device 1300 may be optional and thus in an example embodiment may include more, less or different components than those described in connection with the example embodiment of the FIG. 13. As such, among other examples, the user device 1300 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1300 includes a controller or a processor 1302 (e.g., a signal processor, microprocessor, ASIC, or other control and processing logic circuitry) for performing such tasks as signal coding, data processing, image processing, input/output processing, power control, and/or other functions. An operating system 1304 controls the allocation and usage of the components of the user device 1300 and support for one or more applications programs, that implements one or more of the innovative features described herein. The applications 1306 may include a payment server application, for example, the application interface for registration of a deceptive character, a predefined mathematical expression and a predefined value. Additionally, the applications 1306 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1300 includes one or more memory components, for example, a non-removable memory 1308 and/or a removable memory 1310. The non-removable memory 1308 and/or the removable memory 1310 may be collectively known as database in an embodiment. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. The user device 1300 may further include a user identity module (UIM) 1312. The UIM 1312 may be a memory device having a processor built in. The UIM 1312 may include, for example, a subscriber identity module (SIM), a universal integrated circuit card (UICC), a universal subscriber identity module (USIM), a removable user identity module (R-UIM), or any other smart card. The UIM 1312 typically stores information elements related to a mobile subscriber. The UIM 1312 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1300 can support one or more input devices 1320 and one or more output devices 1330. Examples of the input devices 1320 may include, but are not limited to, a touch screen/a display screen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images), a keypad 1328 and a fingerprint sensor 1348. Examples of the output devices 1330 may include, but are not limited to a speaker 1332 and a display 1334. Other possible output devices can include piezoelectric or other haptic output devices. Some devices can serve more than one input/output function. For example, the touch screen 1322 and the display 1334 can be combined into a single input/output device.

A wireless modem 1340 can be coupled to one or more antennas (not shown in the FIG. 13) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the user device 1300 and a public switched telephone network (PSTN).

The user device 1300 can further include one or more input/output ports 1350 for establishing connection with peripheral devices including the POS terminal 1100, a power supply 1352, one or more sensors 1354 for example, an accelerometer, a gyroscope, a compass, or an infrared proximity sensor for detecting the orientation or motion of the user device 1300 and biometric sensors for scanning biometric identity of an authorized user, a transceiver 1356 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

The disclosed methods with reference to FIGS. 1 to 13, or one or more operations of the flow diagram 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1000 (e.g., the servers 112, 114 and 116) and its various components such as the computer system 1005 and the database 1010 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method of checking network connectivity of an acquirer server and a plurality of payment entity servers in the payment network, the method comprising the steps of:

receiving, by an acquirer server, a connectivity information request from a merchant terminal, wherein the connectivity information request comprises payment cardholder information;

generating, by the acquirer server, a payment transaction request based on the connectivity information request;

storing, by the acquirer server, the payment transaction request;

generating, by the acquirer server, a connectivity check message, wherein the connectivity check message includes a plurality of status flags;

communicating, by the acquirer server and a plurality of the payment entity servers, the connectivity check message in a predefined payment transaction flow sequence in the payment network;

determining, by the acquirer server and each of the plurality of the payment entity servers, an ability to successfully communicate the connectivity check message, and setting, by the acquirer server and each of the plurality of the payment entity servers, the status flags for the acquirer server and each of the plurality of the payment entity servers based on the determinations;

receiving, by the acquirer server, the connectivity check message;

checking, by acquirer server, each of the status flags in the connectivity check message;

sending, by the acquirer server, successful connectivity information to the merchant terminal; and, sending, by the acquirer server, the payment transaction request to the payment server.

2. The method as claimed in claim 1, wherein the generating the connectivity check message includes presetting each of the status flags to a failure state.

3. The method as claimed in claim 1, wherein the determining, by the acquirer server and each of the plurality of the payment entity servers, the ability to successfully communicate the connectivity check message comprises:

checking communication terminals of each of the acquirer server and the plurality of the payment entity servers to evaluate connectivity there between.

* * * * *